United States Patent
Kido et al.

(10) Patent No.: US 11,262,681 B2
(45) Date of Patent: Mar. 1, 2022

(54) IMAGE FORMING APPARATUS AND IMAGE READING APPARATUS

(71) Applicant: CANON KABUSHIKI KAISHA, Tokyo (JP)

(72) Inventors: Yasumasa Kido, Abiko (JP); Shin-ichi Sugiyama, Kashiwa (JP); Takashi Hiratsuka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 16/878,833

(22) Filed: May 20, 2020

(65) Prior Publication Data
US 2020/0371462 A1 Nov. 26, 2020

(30) Foreign Application Priority Data

May 21, 2019 (JP) .............................. JP2019-095114
May 21, 2019 (JP) .............................. JP2019-095116

(51) Int. Cl.
*G03G 15/22* (2006.01)
*F16H 57/021* (2012.01)
*F16H 1/06* (2006.01)

(52) U.S. Cl.
CPC ............. *G03G 15/221* (2013.01); *F16H 1/06* (2013.01); *F16H 57/021* (2013.01)

(58) Field of Classification Search
CPC ................................ G03G 15/221; F16H 1/06
See application file for complete search history.

(56) References Cited

U.S. PATENT DOCUMENTS

| 2006/0088340 | A1 | 4/2006 | Kimijima et al. |
| 2013/0084103 | A1* | 4/2013 | Hashimoto ........ G03G 15/5008 |
| | | | 399/167 |
| 2016/0216637 | A1* | 7/2016 | Maeshima ......... G03G 15/0806 |

FOREIGN PATENT DOCUMENTS

JP 2006-117426 A 5/2006

* cited by examiner

*Primary Examiner* — Zakaria Elahmadi
(74) *Attorney, Agent, or Firm* — Venable LLP

(57) ABSTRACT

An image forming apparatus includes: a motor which is provided in a housing of the image forming apparatus; a first gear which includes a rotation shaft axially supported by the housing; a first bearing and a second bearing which support the rotation shaft of the first gear and are arranged on one side and the other side of the first gear; a second gear which includes a rotation shaft and meshes with the first gear; a rotating member to which the second gear is attached and which is rotatable with respect to the housing so as to be positioned at a first position at which the first gear and the second gear mesh with each other and at a second position at which the second gear is separated from the first gear; a third bearing and a fourth bearing which support the rotation shaft of the second gear and are arranged on one side and the other side of the second gear; and a holding member which is provided in the housing integrally holds the first bearing and the second bearing, the holding member having a first groove portion which is formed on a movement locus of the third bearing moving by the rotation of the rotating member, into which the third bearing enters when the rotating member moves from the second position to the first position, and which holds the third bearing when the rotating member is positioned at the first position, and the holding member having a second groove portion which is formed on a movement locus of the fourth bearing moving by the rotation of the rotating member, into which the fourth bearing (Continued)

enters when the rotating member moves from the second position to the first position, and which holds the fourth bearing when the rotating member is positioned at the first position.

14 Claims, 22 Drawing Sheets

IMAGE FORMING APPARATUS AND IMAGE READING APPARATUS

BACKGROUND OF THE INVENTION

Field of the Invention

The present invention relates to an image forming apparatus such as an electrophotographic copying machine and an electrophotographic printer (for example, a laser beam printer and an LED printer), and an image reading apparatus such as a scanner.

Description of the Related Art

An image forming apparatus having a configuration in which an opening/closing member rotates with respect to a housing and can be opened and closed with respect to the housing to enable removal of a jammed sheet or replacement of a consumable mounted inside the apparatus has been known.

Further, a configuration in which a conveying roller that conveys a sheet is supported by an opening/closing member has been known. In this configuration, a driving force of a motor provided in a housing is transmitted to the conveying roller via a gear. Specifically, a drive gear is provided on the housing, a driven gear meshing with the drive gear is provided on the opening/closing member, and the driving force of the motor is transmitted to the conveying roller via these gears. The driven gear is separated from the drive gear when the opening/closing member is opened, and meshes with the drive gear when the opening/closing member is closed, such that the driving force of the motor can be transmitted.

Here, it is not easy to ensure position accuracy of the opening/closing member with respect to the housing due to a backlash of a rotating portion of the opening/closing member or variation in size. Therefore, it is not easy to ensure meshing accuracy between the drive gear and the driven gear. In this regard, Japanese Patent Laid-Open No. 2006-117426 discloses a configuration in which a guide member provided in a housing guides a rotation shaft of a driven gear to a predetermined position, thereby improving meshing accuracy between a drive gear and the driven gear.

In the configuration described in Japanese Patent Laid-Open No. 2006-117426, the rotation shaft of the driven gear has one side that is guided by the guide member and held at a predetermined position, and the other side that is not held, in a thrust direction. In a case where only one side of the rotation shaft of the driven gear is held as described above, the rotation shaft of the driven gear may be inclined and a degree of parallelization of a rotation shaft of the drive gear and the rotation shaft of the driven gear may deteriorate. In a case where the degree of parallelization of the two rotation shafts deteriorates, the drive gear is misaligned with the driven gear, such that the following problem can occur.

FIGS. 12A to 12C are each a perspective view illustrating a drive gear and a driven gear. Here, FIG. 12A illustrates a configuration in which a rotation shaft of the drive gear and a rotation shaft of the driven gear are arranged in parallel. In a case where the rotation shaft of the drive gear and the rotation shaft of the driven gear are arranged so that the rotation shaft of the driven gear is inclined at an angle θ1 with respect to a vertical direction as illustrated in FIG. 12B, a meshing error, in which tooth surfaces of the drive gear and the driven gear are not engaged with each other, occurs. In a case where the rotation shaft of the drive gear and the rotation shaft of the driven gear are arranged so that the rotation shaft of the driven gear is inclined at an angle θ2 with respect to a horizontal direction as illustrated in FIG. 12C, a parallelization error, in which rotational axes of the rotation shafts intersect with each other, occurs. Such a meshing error or parallelization error causes uneven wear between the drive gear and the driven gear, a driving force transmission error, and abnormal noise. Therefore, it is desirable that the degree of parallelization of the rotation shaft of the drive gear and the rotation shaft of the driven gear is kept high.

SUMMARY OF THE INVENTION

It is desirable to provide an image forming apparatus capable of suppressing deterioration in a degree of parallelization of a rotation shaft of a drive gear provided on a housing and a rotation shaft of a driven gear provided on a rotating member rotatable with respect to the housing.

According to a representative configuration of the present invention, an image forming apparatus includes: a motor which is provided in a housing of the image forming apparatus; a first gear which includes a rotation shaft axially supported by the housing and rotating by a driving force of the motor; a first bearing and a second bearing which support the rotation shaft of the first gear and are arranged on one side and the other side of the first gear, respectively, in a rotational axis direction of the first gear; a second gear which includes a rotation shaft and meshes with the first gear, the rotation shaft rotating by the driving force of the motor transmitted via the first gear; a rotating member to which the second gear is attached and which is rotatable with respect to the housing so as to be positioned at a first position at which the first gear and the second gear mesh with each other and at a second position at which the second gear is separated from the first gear; a third bearing and a fourth bearing which support the rotation shaft of the second gear and are arranged on one side and the other side of the second gear, respectively, in a rotational axis direction of the second gear; and a holding member which is provided in the housing integrally holds the first bearing and the second bearing, the holding member having a first groove portion which is formed on a movement locus of the third bearing moving by the rotation of the rotating member, into which the third bearing enters when the rotating member moves from the second position to the first position, and which holds the third bearing when the rotating member is positioned at the first position, and extends in a rotation direction of the rotating member, and the holding member having a second groove portion which is formed on a movement locus of the fourth bearing moving by the rotation of the rotating member, into which the fourth bearing enters when the rotating member moves from the second position to the first position, and which holds the fourth bearing when the rotating member is positioned at the first position, and extends in the rotation direction of the rotating member.

Further features of the present invention will become apparent from the following description of exemplary embodiments with reference to the attached drawings.

DESCRIPTION OF THE EMBODIMENTS

First Embodiment

<Image Forming Apparatus>

Hereinafter, an overall configuration of an image forming apparatus according to a first embodiment of the present invention will be described together with an operation at the time of image formation with reference to the drawings. Note that the dimensions, materials, shapes, relative arrangements, and the like of components described below are not intended to limit the scope of the present invention unless otherwise specified.

Figure 1:
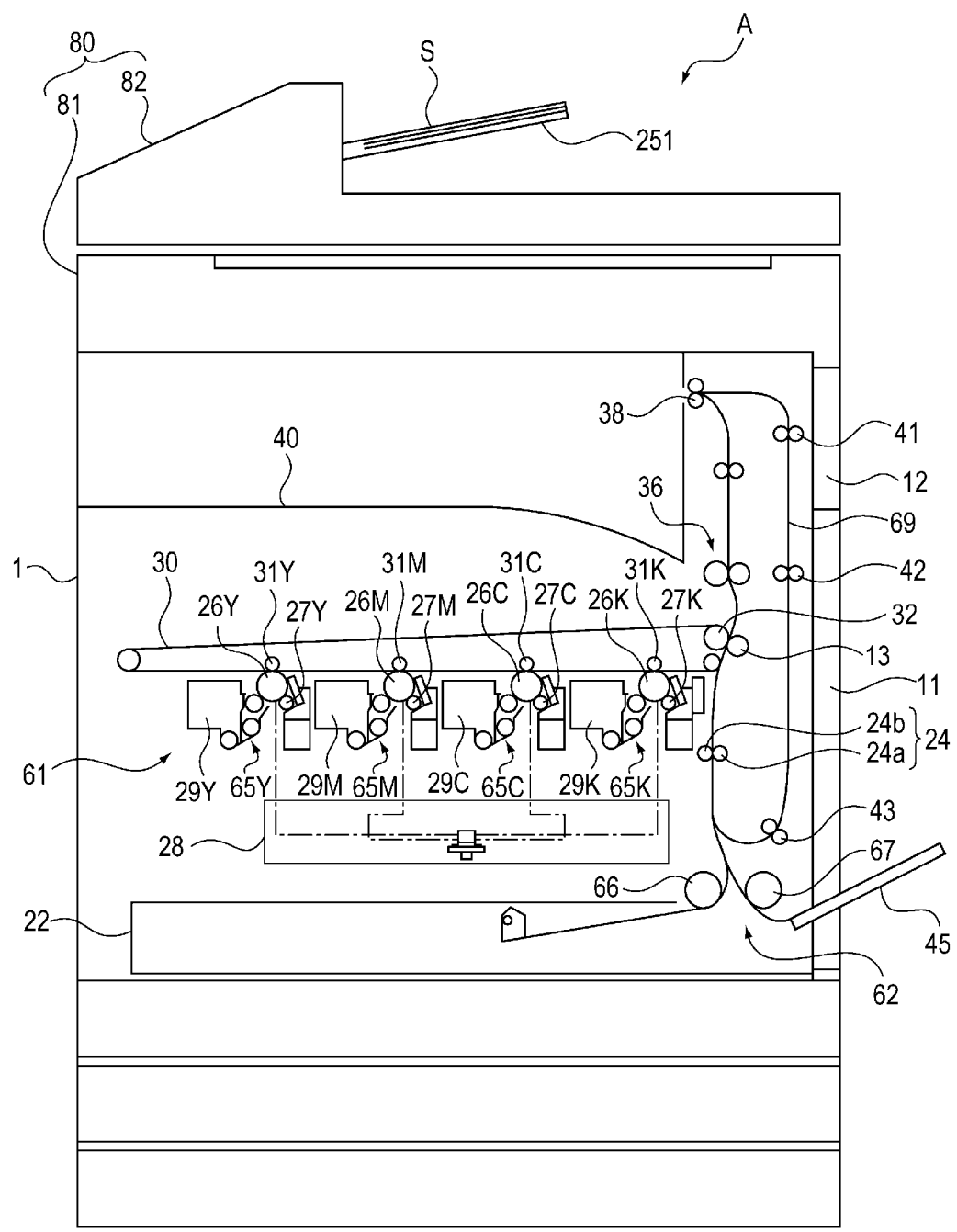
FIG. 1 is a schematic cross-sectional view of an image forming apparatus.

FIG. 1 is a schematic cross-sectional view of an image forming apparatus A. As illustrated in FIG. 1, the image forming apparatus A includes an image forming portion 61 which transfers a toner image to a sheet to form an image, a sheet feeding portion 62 that supplies the sheet to the image forming portion 61, and a fixing portion 36 which fixes the toner image to the sheet. Further, an image reading apparatus 80 which reads an image of an original is provided on an upper portion of the image forming apparatus A. A detailed configuration of the image reading apparatus 80 will be described later.

The image forming portion 61 includes process cartridges 65 (65Y, 65M, 65C, and 65K), a laser scanner unit 28, primary transfer rollers 31 (31Y, 31M, 31C, and 31K), an intermediate transfer belt 30, a secondary transfer roller 13, a secondary transfer counter roller 32, and the like. The process cartridges 65 each include a photosensitive drum 26 (26Y, 26M, 26C, or 26K), a charging roller 27 (27Y, 27M, 27C, or 27K), and a developing device 29 (29Y, 29M, 29C, or 29K).

Next, an image forming operation will be described. First, when a controller (not illustrated) receives an image forming job signal, a sheet S loaded and stored in a sheet cassette 22 is conveyed to registration rollers 24 by a feeding roller 66. When the sheet S loaded in a multi-purpose tray 45 is fed, the sheet S loaded in the multi-purpose tray 45 is conveyed to the registration rollers 24 by a feeding roller 67.

The registration rollers 24 convey the sheet S at a predetermined timing to a secondary transfer portion formed by the secondary transfer roller 13 and the secondary transfer counter roller 32. Note that the registration rollers 24 are a pair of two rollers (registration rollers 24a and 24b) forming a nip portion, and the sheet S is nipped at the nip portion and conveyed.

Meanwhile, in the image forming portion 61, first, a surface of the photosensitive drum 26Y is charged by the charging roller 27Y. Thereafter, the laser scanner unit 28 irradiates the surface of the photosensitive drum 26Y with laser light according to an image signal input from the image reading apparatus 80 or an image signal input from an external device such as a personal computer. That is, the image forming apparatus A functions as a copying machine in a case where an image signal is input from the image reading apparatus 80, and functions as a printer in a case where an image signal is input from an external device. In this way, an electrostatic latent image is formed on the surface of the photosensitive drum 26Y.

Thereafter, yellow toner is attached to the electrostatic latent image formed on the surface of the photosensitive drum 26Y by the developing device 29Y to form a yellow toner image on the surface of the photosensitive drum 26Y. As a bias is applied to the primary transfer roller 31Y, the toner image formed on the surface of the photosensitive drum 26Y is primarily transferred to the intermediate transfer belt 30.

Magenta, cyan, and black toner images are formed on the photosensitive drums 26M, 26C, and 26K, respectively, by the same process. Further, as a bias is applied to the primary transfer rollers 31M, 31C, and 31K, these toner images are overlappingly transferred onto the yellow toner image on the intermediate transfer belt 30. As a result, a full-color toner image is formed on a surface of the intermediate transfer belt 30.

The intermediate transfer belt 30 is rotationally moved by rotation of the secondary transfer counter roller 32 by a driving force of a motor (not illustrated). When the intermediate transfer belt 30 carrying the toner image moves, the toner image is sent to the secondary transfer portion. Then, as a bias is applied to the secondary transfer roller 13 in the secondary transfer portion, the toner image on the intermediate transfer belt 30 is transferred to the sheet S.

Next, the sheet S to which the toner image is transferred is subjected to a heating and pressurizing process in the fixing portion 36, whereby the toner image on the sheet S is fixed to the sheet S. Thereafter, the sheet S to which the toner image is fixed is discharged to a discharge portion 40 by a discharge roller 38.

Further, in a case where images are formed on both sides of the sheet S, the discharge roller 38 is rotated in a reverse direction when the sheet S is conveyed to the discharge roller 38, and a conveyance path of the sheet S is switched by a flapper (not illustrated). As a result, the sheet S is conveyed to a reverse conveyance path 69 with the front and back reversed. Thereafter, the sheet S is conveyed to conveying rollers 41, 42, and 43 in the reverse conveyance path 69, and then is conveyed to the registration rollers 24. Thereafter, an image is formed on a back surface of the sheet S in the same manner as in the above-described process.

<Door>

Next, a configuration of each door that can be opened and closed with respect to a housing 1 of the image forming apparatus A will be described.

Figure 2:
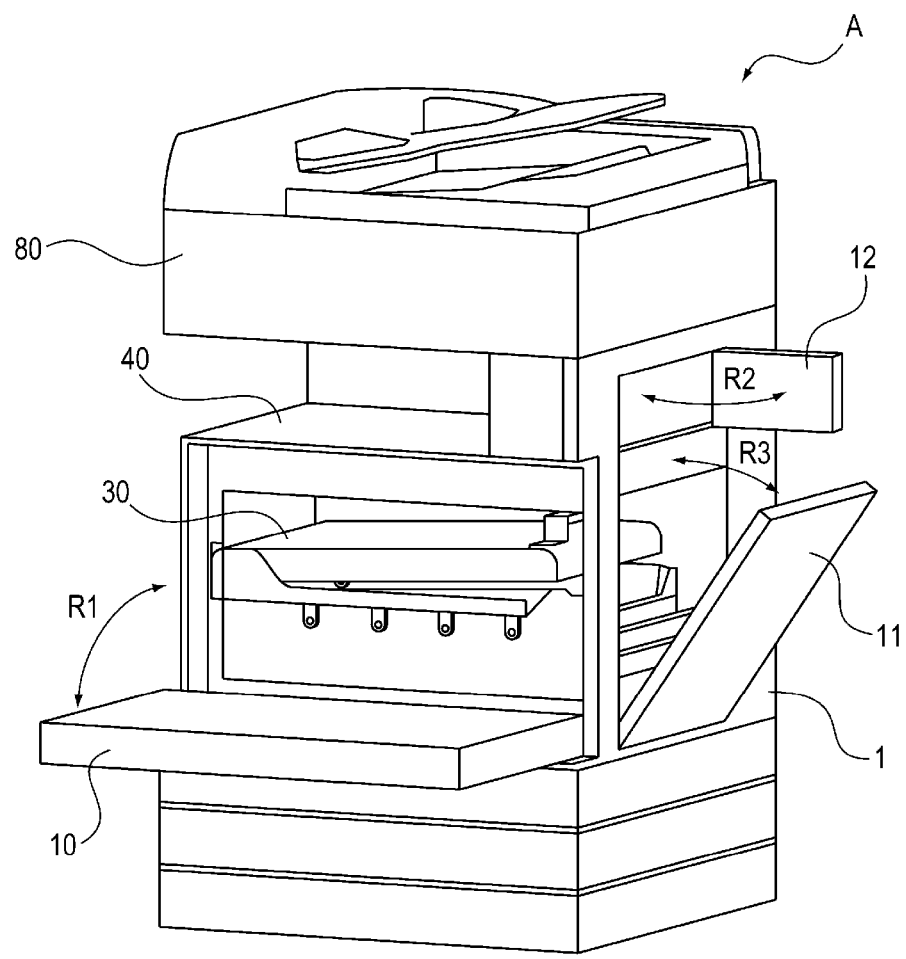
FIG. 2 is a schematic perspective view of the image forming apparatus.

FIG. 2 is a schematic perspective view of the image forming apparatus A. As illustrated in FIG. 2, a front door 10, a right door 11, and a discharge door 12 are provided in the image forming apparatus A. These members are each configured to be movable between an open position at which the door opened with respect to the housing 1 is positioned and a close position at which the door closed with respect to the housing 1 is positioned.

The front door 10 is supported so as to be rotatable with respect to the housing 1 in a direction of Arrow R1. The discharge door 12 is supported so as to be rotatable with respect to the housing 1 in a direction of Arrow R2. A user can replace the process cartridges 65 in a state where the front door 10 is positioned at the open position.

The right door 11 (rotating member) is supported so as to be rotatable with respect to the housing 1 in a direction of Arrow R3. The right door 11 supports the secondary transfer roller 13, the registration roller 24a, and the conveying rollers 42 and 43. When the right door 11 moves from the close position to the open position, the secondary transfer roller 13 is separated from the intermediate transfer belt 30. As a result, it is possible to easily remove the sheet S that is nipped between the secondary transfer roller 13 and the intermediate transfer belt 30 and causes the jam. Further, when the right door 11 moves from the close position to the open position, the registration roller 24a is separated from the registration roller 24b. As a result, it is possible to easily remove the sheet S that is nipped between the secondary transfer roller 13 and the intermediate transfer belt 30 and causes the jam.

<Driving Portion>

Next, a configuration of a driving portion that drives the conveying roller 42 will be described.

Figure 3:
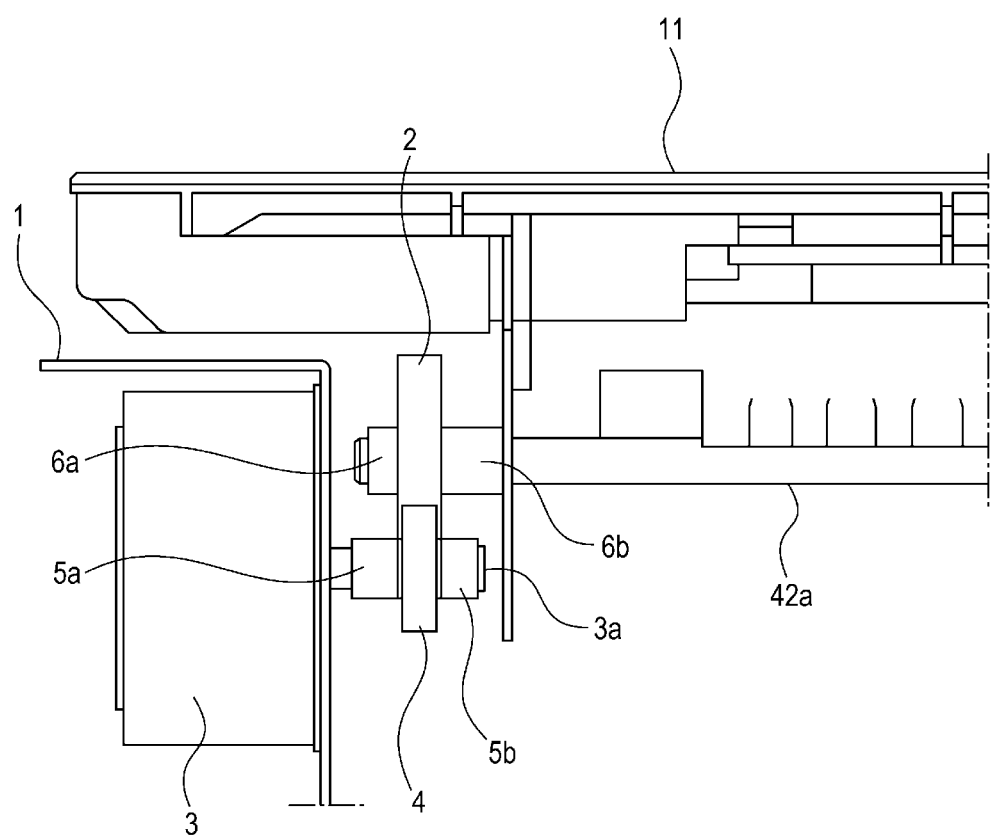
FIG. 3 is a schematic view of a driving portion that drives a conveying roller.

FIG. 3 is a schematic view of the driving portion that drives the conveying roller 42 when the right door 11 is viewed from above. Note that, in FIG. 3, the right door 11 is positioned at the close position at which the right door 11 closed with respect to the housing 1 is positioned.

As illustrated in FIG. 3, a motor 3 is provided in the housing 1. A first gear 4 is attached to a rotation shaft 3a of the motor 3. Further, bearings 5a and 5b formed of a resin are attached to the rotation shaft 3a of the motor 3.

In a thrust direction of the rotation shaft 3a of the motor 3, the bearing 5a (first bearing) is arranged adjacent to the first gear 4 on one side of the first gear 4, and the bearing 5b (second bearing) is arranged adjacent to the first gear 4 on the other side of the first gear 4. The bearings 5a and 5b are members that are concentric with the rotation shaft 3a of the motor 3, an inner diameter of each of the bearings 5a and 5b is several μm larger than an outer diameter of the rotation shaft 3a, and an outer diameter of each of the bearings 5a and 5b is about twice as large as a base thickness from the inner diameter.

Further, the first gear 4 attached to the rotation shaft 3a of the motor 3 meshes with a second gear 2 attached to one end portion of a rotation shaft 42a of the conveying roller 42.

Bearings 6a and 6b formed of a resin are attached to the rotation shaft 42a of the conveying roller 42.

In a thrust direction of the rotation shaft 42a of the conveying roller 42, the bearing 6a (third bearing) is arranged adjacent to the second gear 2 on one side of the second gear 2, and the bearing 6b (fourth bearing) is arranged adjacent to the second gear 2 on the other side of the second gear 2. The bearings 6a and 6b are members that are concentric with the rotation shaft 42a of the conveying roller 42, an inner diameter of each of the bearings 6a and 6b is several μm larger than an outer diameter of the rotation shaft 42a, and an outer diameter of each of the bearings 6a and 6b is about twice as large as a base thickness from the inner diameter.

As described above, since the conveying roller 42 is supported by the right door 11, when the right door 11 is positioned at the open position (second position), the second gear 2 is separated from the first gear 4 to be a state where the second gear 2 and the first gear 4 do not mesh with each other, such that the driving force cannot be transmitted. On the other hand, when the right door 11 is positioned at the close position (first position), the second gear 2 and the first gear 4 mesh with each other, and the driving force of the motor 3 is transmitted from the second gear 2 to the first gear 4. As described above, the driving force of the motor 3 is transmitted to the conveying roller 42 via the second gear 2 and the first gear 4, such that the conveying roller 42 rotates.

<Holder Member>

It is not easy to ensure position accuracy of the right door 11 with respect to the housing 1 due to a backlash of a rotating portion of the right door 11 or variation in size. Therefore, it is not easy to ensure a degree of parallelization of the rotation shaft 3a of the motor 3 and the rotation shaft 42a of the conveying roller 42. In a case where the degree of parallelization of the rotation shaft 3a of the motor 3 and the rotation shaft 42a of the conveying roller 42 is not ensured, the above-described meshing error or parallelization error may occur between the first gear 4 and the second gear 2. Therefore, in the present embodiment, a holder member 7 (holding member) suppresses deterioration in the degree of parallelization of the rotation shaft 3a of the motor 3 and the rotation shaft 42a of the conveying roller 42. Hereinafter, a configuration of the holder member 7 will be described.

Figure 4A:
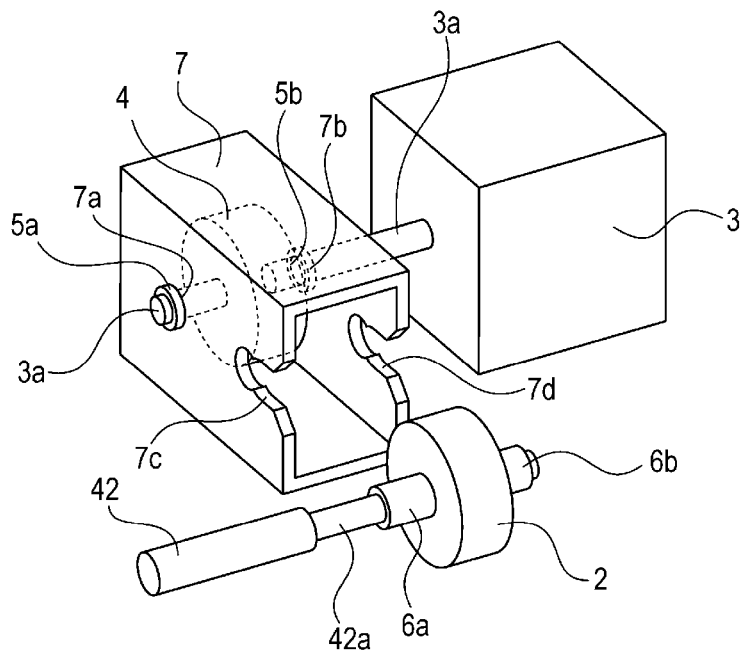
FIGS. 4A and 4B are each a perspective view of a holder member.
Figure 4B:
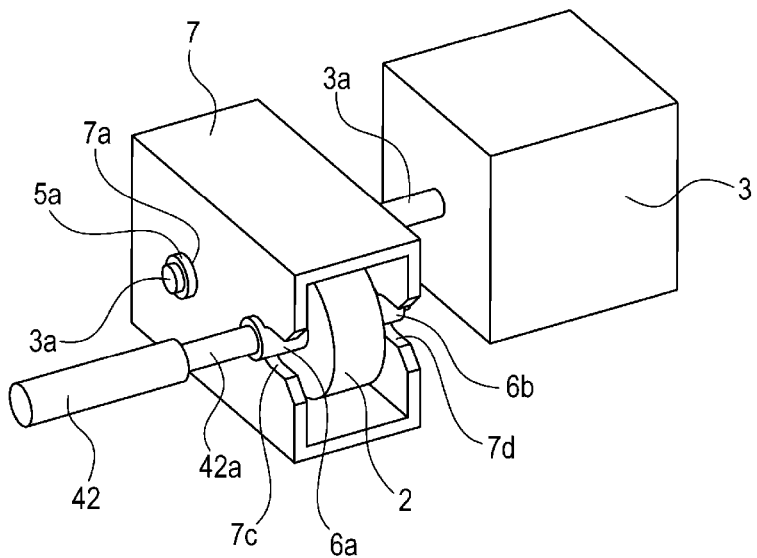
Figure 5A:
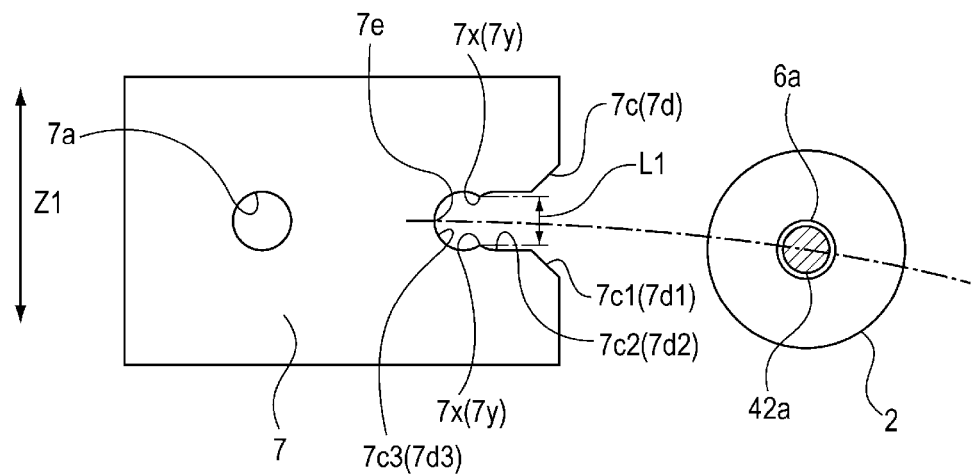
FIGS. 5A and 5B are each a front view of the holder member.
Figure 5B:
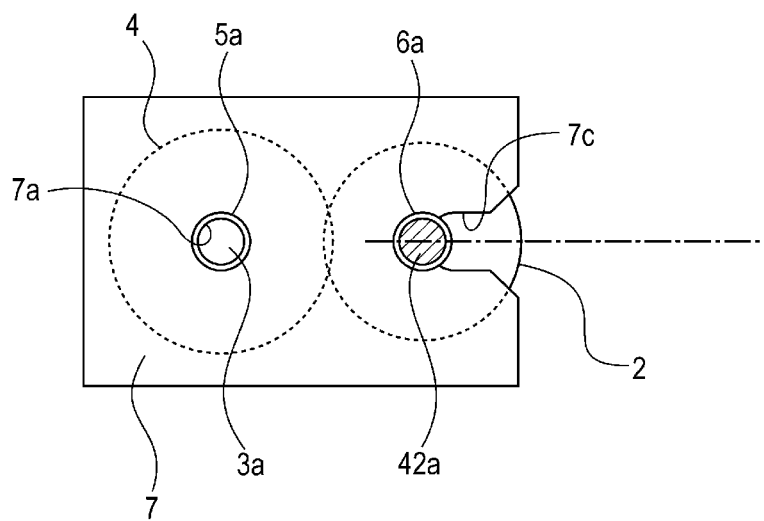

FIGS. 4A and 4B are each a perspective view of the holder member 7. FIGS. 5A and 5B are each a front view of the holder member 7. Here, FIG. 4A illustrates a state where the bearings 5a and 5b supporting the rotation shaft 3a of the motor 3 are supported by the holder member 7 and the bearings 6a and 6b supporting the rotation shaft 42a of the conveying roller 42 are not yet held by the holder member 7. FIG. 5A illustrates a state before the holder member 7 holds the bearings 5a and 5b and the bearings 6a and 6b. FIGS. 4B and 5B each illustrate a state where the holder member 7 holds the bearings 5a and 5b and the bearings 6a and 6b.

As illustrated in FIG. 4, the holder member 7 is a resin member provided in the housing 1 and formed of a polyacetal resin (POM) or an acrylonitrile butadiene styrene (ABS) resin. The holder member 7 has two fitting holes 7a and 7b (first fitting hole and second fitting hole) into which the bearings 5a and 5b supporting the rotation shaft 3a of the motor 3 are fitted, respectively. Further, the holder member 7 has two fitting grooves 7c and 7d (first groove portion and second groove portion) into which the bearings 6a and 6b supporting the rotation shaft 42a of the conveying roller 42 are fitted, respectively.

As described above, the rotation shaft 42a of the second gear 2 is supported by the right door 11. Therefore, the bearings 6a and 6b attached to the rotation shaft 42a of the second gear 2 rotate by the rotation of the right door 11, together with the rotation shaft 42a of the second gear 2, in a state where the rotation shaft 42a of the second gear 2 is inserted into openings of the bearings 6a and 6b. The fitting groove 7c of the holder member 7 is a groove that is formed on a movement locus of the bearing 6a moving by the rotation of the right door 11, and extends in a rotation direction of the right door 11. The fitting groove 7d is a groove that is formed on a movement locus of the bearing 6b moving by the rotation of the right door 11, and extends in the rotation direction of the right door 11. The fitting grooves 7c and 7d can also be referred to as recess portions that are recessed in the rotation direction of the right door 11 from a surface of the holder member 7 that faces the right door 11.

The bearings 5a and 5b and the bearings 6a and 6b are fitted into the fitting holes 7a and 7b and the fitting grooves 7c and 7d, respectively, such that the bearings 5a and 5b and the bearings 6a and 6b are held by the holder member 7. When the motor 3 is driven in a state where the bearings 5a and 5b and the bearings 6a and 6b are held by the holder member 7, the rotation shaft 3a of the motor 3 and the rotation shaft 42a of the conveying roller 42 rotate, and the bearings 5a and 5b and the bearings 6a and 6b do not rotate.

As illustrated in FIG. 5, an inclined portion 7c1 (first inclined portion) of which width in a direction (direction of Arrow Z1) orthogonal to the rotation direction of the right door 11 and a rotational axis direction of the second gear 2 is decreased toward a back side of the fitting groove 7c is provided adjacent to an opening of the fitting groove 7c. Further, a flat portion 7c2 of which width in the direction of Arrow Z1 does not change is provided behind the inclined portion 7c1. In addition, an arc-shaped positioning portion 7c3 which positions the bearing 6a is provided behind the flat portion 7c2.

In the fitting groove 7c, two protrusions 7x (first protrusions) protruding in the direction of Arrow Z1 are provided at portions between the flat portion 7c2 and the positioning portion 7c3. A distance L1 in the direction of Arrow Z1 that connects vertices of the two protrusions 7x is 1 mm smaller than the outer diameter of the bearing 6a. Therefore, in a process in which the right door 11 moves from the open position to the close position, the bearing 6a is fitted into the fitting groove 7c as follows.

That is, when entering the fitting groove 7c, the bearing 6a first passes through the inclined portion 7c1. Here, even in a case where a position of the bearing 6a is slightly shifted due to the influence of tolerance or the like, the bearing 6a is guided to the inside of the fitting groove 7c by abutting on the inclined portion 7c1. Next, the bearing 6a is guided by the flat portion 7c2 to move further to the inner side of the fitting groove 7c.

Next, the bearing 6a comes into contact with the protrusions 7x provided in the fitting groove 7c, and presses the protrusions 7x toward the inner side of the fitting groove 7c. As a result, the protrusions 7x are elastically deformed and the distance L1 is expanded, such that the bearing 6a passes through the vertices of the protrusions 7x. Then, when the right door 11 moves to the close position, the bearing 6a abuts on an abutting surface 7e of the fitting groove 7c, and is fitted and held at a predetermined position between the abutting surface 7e and the two protrusions 7x in the positioning portion 7c3.

Note that, in a process in which the right door 11 moves from the close position to the open position, an operation reverse to the above-described operation is performed. The configuration of the fitting groove 7c has been described here, and the fitting groove 7d has the same configuration. That is, since the fitting groove 7d has the same shape as that of the fitting groove 7c, the fitting groove 7d has an inclined portion 7d1 (second inclined portion), a flat portion 7d2, a positioning portion 7d3, and protrusions 7y (second protrusions), similarly to the fitting groove 7c.

As described above, the holder member 7 integrally holds the bearing 5a arranged on one side of the first gear 4 in a rotational axis direction of the first gear 4 and the bearing 5b arranged on the other side of the first gear 4 at predetermined positions. Further, the holder member 7 integrally holds the bearing 6a arranged on one side of the second gear 2 in a rotational axis direction of the second gear 2, and the bearing 6b arranged on the other side of the second gear 2 at predetermined positions. As a result, it is possible to suppress deterioration in the degree of parallelization of the rotation shaft 3a of the motor 3 supported by the bearings 5a and 5b and axially supporting the first gear 4, and the rotation shaft 42a of the conveying roller 42 supported by the bearings 6a and 6b and axially supporting the second gear 2. Therefore, it is possible to suppress the occurrence of the above-described meshing error and parallelization error between the first gear 4 and the second gear 2, and it is possible to suppress uneven wear between the first gear 4 and the second gear 2, a driving force transmission error, and abnormal noise.

The protrusions 7x and 7y prevents the bearings 6a and 6b fitted into the fitting grooves 7c and 7d, respectively, from moving in a direction of movement of the right door 11 from the close position to the open position, respectively, when the right door 11 is positioned at the close position, by abutting on the bearings 6a and 6b, respectively. Accordingly, when the right door 11 is positioned at the close position, the bearings 6a and 6b are prevented from moving inside the fitting grooves 7c and 7d, and the degree of parallelization of the rotation shaft 3a of the motor 3 and the rotation shaft 42a of the conveying roller 42 can be more effectively suppressed.

In the present embodiment, the configuration in which the holder member 7 is provided in the housing 1 has been described, but the present invention is not limited thereto. That is, the holder member 7 may be provided on the right door 11. In this case, the bearings 6a and 6b supporting the rotation shaft 42a of the conveying roller 42 are fitted into the fitting holes 7a and 7b, respectively, and the bearings 5a and 5b supporting the rotation shaft 3a of the motor 3 are fitted into the fitting grooves 7c and 7d, respectively. As a result, the same effect as described above can be obtained.

Further, although two protrusions are provided in each of the fitting grooves 7c and 7d in the present embodiment, only one protrusion may be provided on the movement locus of the right door 11, or three or more protrusions may be provided. That is, as long as the bearings 6a and 6b fitted into the fitting grooves 7c and 7d, respectively, can be prevented from moving in the direction of the movement of the right door 11 from the close position to the open position when the right door 11 is positioned at the close position, the number of protrusions may be changed as appropriate.

Figure 6:
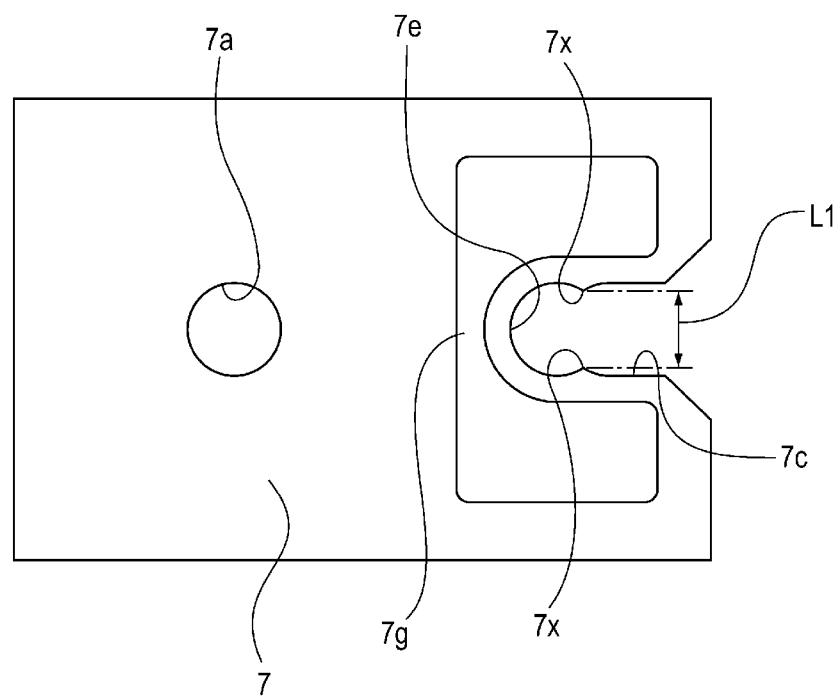
FIG. 6 is a view illustrating another configuration of the holder member.

Further, as illustrated in FIG. 6, a deformation hole 7g for elastically deforming the abutting surface 7e when the bearings 6a and 6b abut on the abutting surface 7e may be provided around the fitting grooves 7c and 7d. As a result, in a case where the right door 11 is slammed, and the bearings 6a and 6b vigorously collide with the abutting surface 7e, the abutting surface 7e is elastically deformed to absorb energy at the time of the collision. Therefore, as the bearings 6a and 6b or the abutting surface 7e is plastically deformed due to an impact, it is possible to suppress a positional relationship between the rotation shaft 3a of the motor 3 and the rotation shaft 42a of the conveying roller 42 from being changed.

Figure 7A:
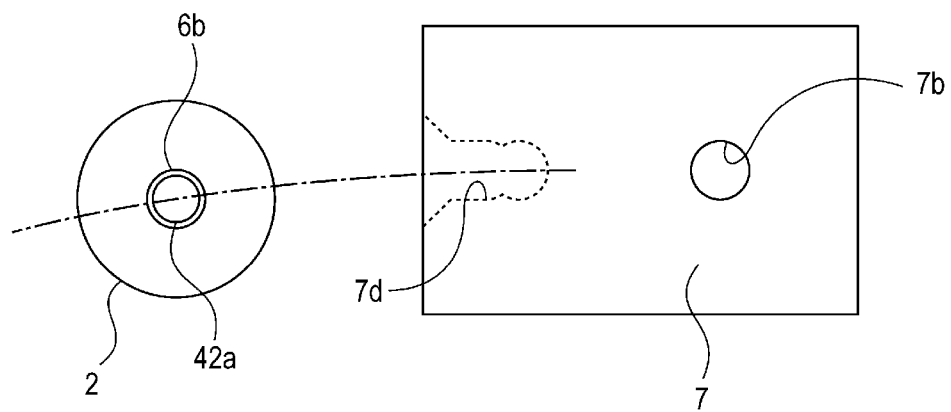
FIGS. 7A and 7B are each a view illustrating another configuration of the holder member.
Figure 7B:
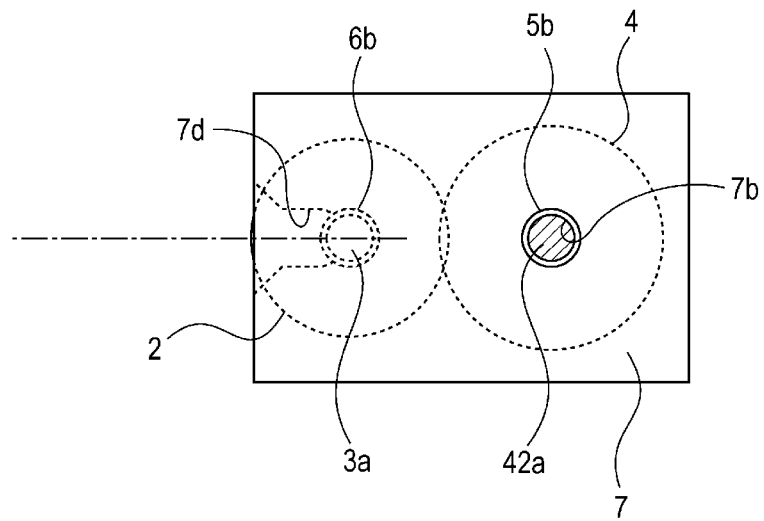

Further, the configuration in which the fitting grooves 7c and 7d of the holder member 7 penetrate in the rotational axis direction of the second gear 2 has been described in the present embodiment, but the present invention is not limited thereto. That is, the same effect as described above can be obtained even with a configuration in which a wall is provided in each of the fitting grooves 7c and 7d of the holder member 7 so as to be adjacent to an end portion of the rotation shaft 42a of the second gear 2, as illustrated in FIGS. 7A and 7B.

Further, in the present embodiment, a configuration in which the rotation shaft 3a of the first gear 4 and the rotation shaft 42a of the second gear 2 are held by the holder member 7 via the bearings 5a and 5b and the bearings 6a and 6b. However, the present invention is not limited thereto. That is, in a configuration in which the first gear 4 or the second gear 2 is held so as to be rotatable with respect to each rotation shaft thereof, for example, an idler gear, the rotation shaft 3a of the first gear 4 or the rotation shaft 42a of the second gear 2 may be directly held by the holder member 7 without using the bearings. In this case, a portion (first portion) on one side of the rotation shaft 3a of the first gear 4 with respect to the first gear 4 in the rotational axis direction of the first gear 4 is held by the fitting hole 7a, and a portion (second portion) on the other side is held by the fitting hole 7b. Further, a portion (third portion) on one side of the rotation shaft 42a of the second gear 2 with respect to the second gear 2 in the rotational axis direction of the second gear 2 is held by the fitting groove 7c, and a portion (fourth portion) on the other side is held by the fitting groove 7d. As a result, the same effect as described above can be obtained.

<Image Reading Apparatus>

Next, a configuration of the image reading apparatus 80 will be described.

Figure 8:
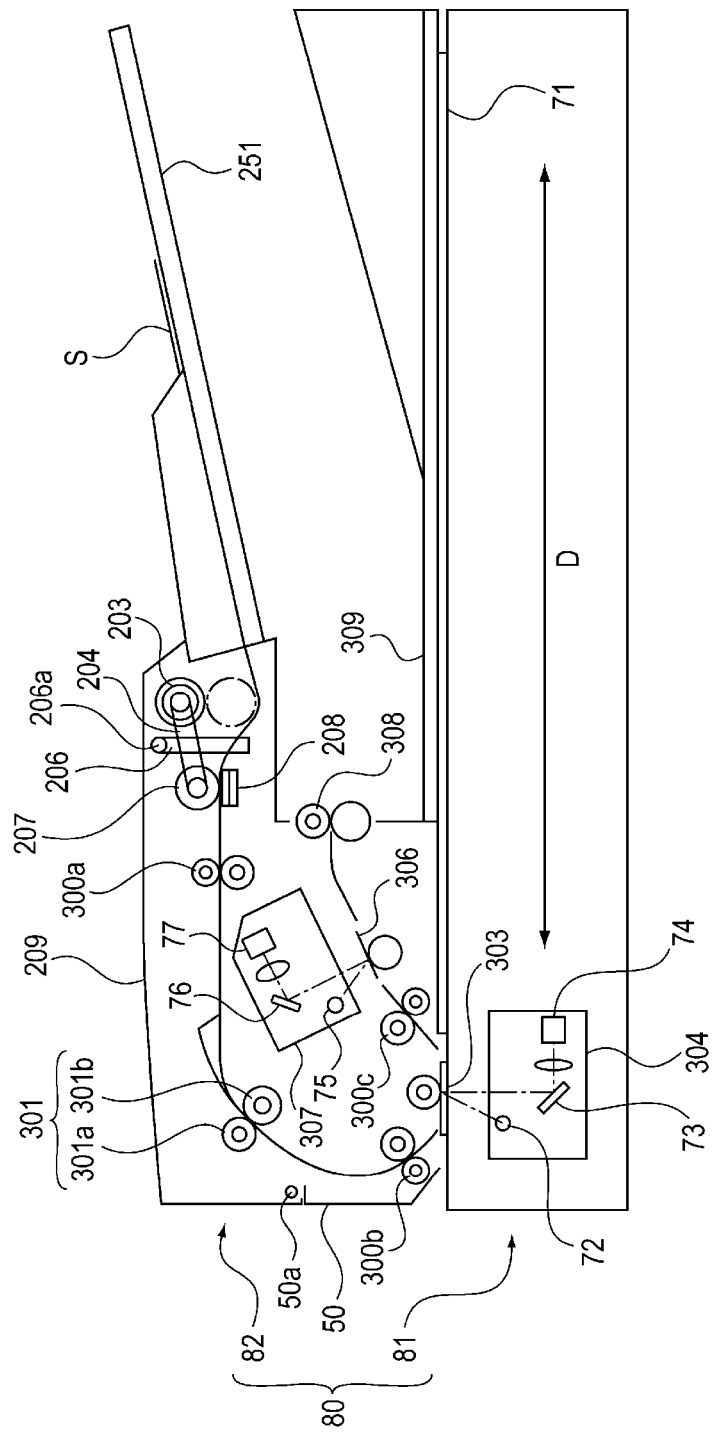
FIG. 8 is a schematic cross-sectional view of an image reading apparatus.

FIG. 8 is a schematic cross-sectional view of the image reading apparatus 80. As illustrated in FIG. 8, the image reading apparatus 80 includes a reader 81 and an auto document feeder (ADF) 82. The ADF 82 is supported so as to be rotatable with respect to the reader 81 by a hinge (not illustrated).

The reader 81 includes a first scanner unit 304 that reads an image of the sheet S which is an original, a contact glass 303, and an original base plate glass 71. The first scanner unit 304 is configured to be movable between a lower portion of the contact glass 303 and a lower portion of the original base plate glass 71 by a driving belt (not illustrated) in a direction of Arrow D.

The first scanner unit 304 includes a light source 72, a mirror 73, and a charge coupled device (CCD) 74 which is an image reading element. The first scanner unit 304 scans the sheet S with light from the light source 72, and guides reflected light from the sheet S to the CCD 74 by the mirror 73. The CCD 74 receives the reflected light, reads image data of the sheet S, and converts the image data into an electric signal.

When reading the image of the sheet S with the reader 81, the sheet S is placed on the original base plate glass 71 and the first scanner unit 304 moves in a direction of Arrow M by the driving belt (not illustrated) to thereby read the image of the sheet S. Access to the original base plate glass 71 is possible by rotating the ADF 82 to open the ADF 82 upward.

The ADF 82 includes an original tray 251 on which the sheet S as an original is loaded, a feeding roller 203 that feeds the sheet S loaded on the original tray 251, and a conveying roller 207 that conveys the sheet S fed by the feeding roller 203. The feeding roller 203 is configured to be liftable and lowerable by a moving mechanism (not illustrated), is lowered at the time of feeding the sheet S, and abuts on the sheet S loaded on the original tray 251. The conveying roller 207 is provided while being pressed with respect to a separation pad 208.

Further, the ADF 82 includes feed rollers 300a to 300c that convey the sheet S and registration rollers 301. The registration rollers 301 are a pair of two rollers (registration rollers 301a and 301b) forming a nip portion, and the sheet S is nipped at the nip portion and conveyed. Here, the registration roller 301b rotates by a driving force of a motor 230 illustrated in FIG. 9, and the registration roller 301a is rotated by rotation of the registration roller 301b.

Further, the ADF 82 includes a second scanner unit 307 that reads the image of the sheet S. The second scanner unit 307 includes a light source 75, a mirror 76, and a CCD 77 which is an image reading element. The second scanner unit 307 scans the sheet S with light from the light source 75, and guides reflected light from the sheet S to the CCD 77 by the mirror 76. The CCD 77 receives the reflected light, reads image data of the sheet S, and converts the image data into an electric signal.

Further, the ADF 82 includes a stopper 206 that prevent the sheet S loaded on the original tray 251 from entering a conveyance path. The stopper 206 is rotatably supported by a support portion 206a. When the feeding roller 203 is lifted and the feeding of the sheet S is not performed, the stopper 206 is kept upright to prevent the sheet S from entering the conveyance path. When the feeding roller 203 is lowered and the feeding of the sheet S is performed, the stopper 206 rotates along a conveying direction of the sheet S to allow the sheet S to enter the conveyance path.

Further, the ADF 82 includes an opening/closing cover 209 (rotating member) as an exterior member. The opening/closing cover 209 is rotatably supported by a support shaft 50a provided in a housing 50 of the ADF 82, and rotates between an open position at which the opening/closing cover 209 opened with respect to the housing 50 is positioned and a close position at which the opening/closing cover 209 closed with respect to the housing 50 is positioned, in a direction of Arrow R4 illustrated in FIG. 9. The opening/closing cover 209 supports the feeding roller 203, the conveying roller 207, the registration roller 301a, and the stopper 206.

When reading the image of the sheet S by the ADF 82, first, one of the sheet S loaded on the original tray 251 is separated by the separation pad 208 and conveyed to the registration rollers 301 by the feeding roller 203, the conveying roller 207, and the feed roller 300a. A distal end portion of the sheet S conveyed to the registration rollers 301 is pressed into the nip portion while abutting on the nip portion of the stopped registration rollers 301, thereby correcting the skew feeding of the sheet S conveyed to the registration rollers 301.

Next, the sheet S is conveyed to the feed roller 300b, and reaches the contact glass 303. Then, the first scanner unit 304 reads an image of a first surface of the sheet S on the contact glass 303. Thereafter, the sheet S is conveyed by the feed roller 300c, and reaches a contact glass 306. Here, in a case where the user instructs reading of an image of a second surface of the sheet S, the second scanner unit 307 reads the image of the second surface of the sheet S on the contact glass 306. Then, the sheet S is discharged to a discharge tray 309 by a discharge roller 308.

<Driving Portion>

Next, a configuration of a driving portion of the ADF 82 will be described.

Figure 9:
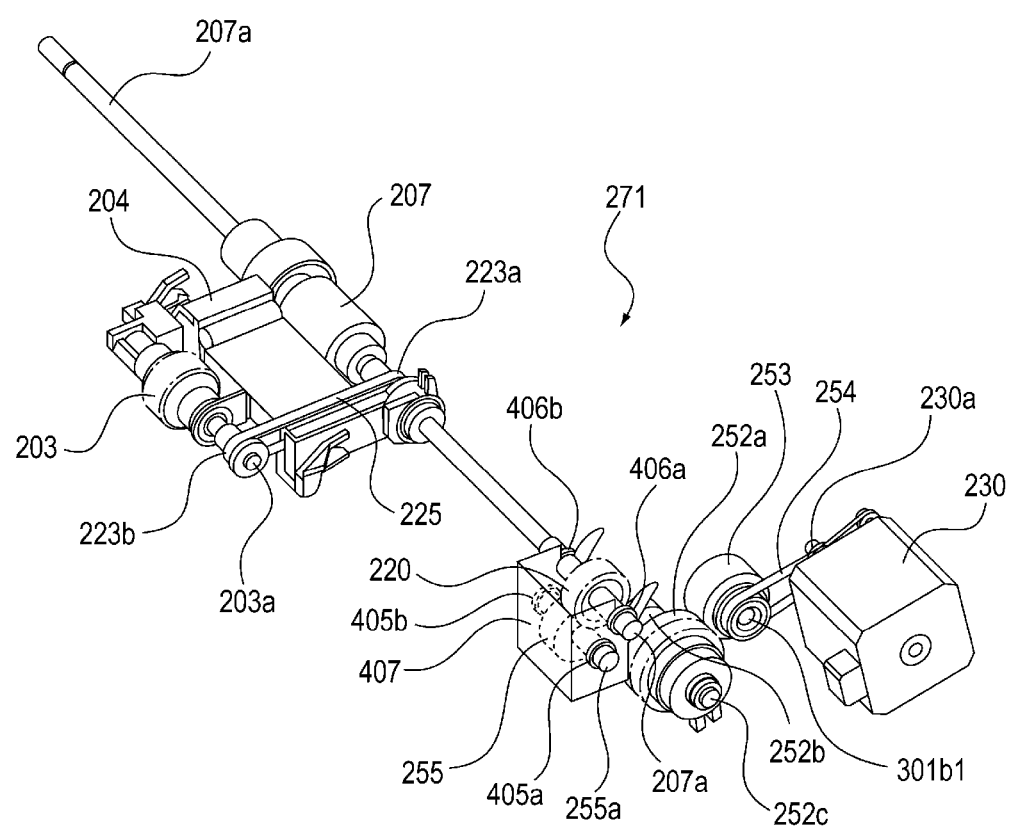
FIG. 9 is a perspective view of a driving portion of an auto document feeder (ADF)
Figure 10A:
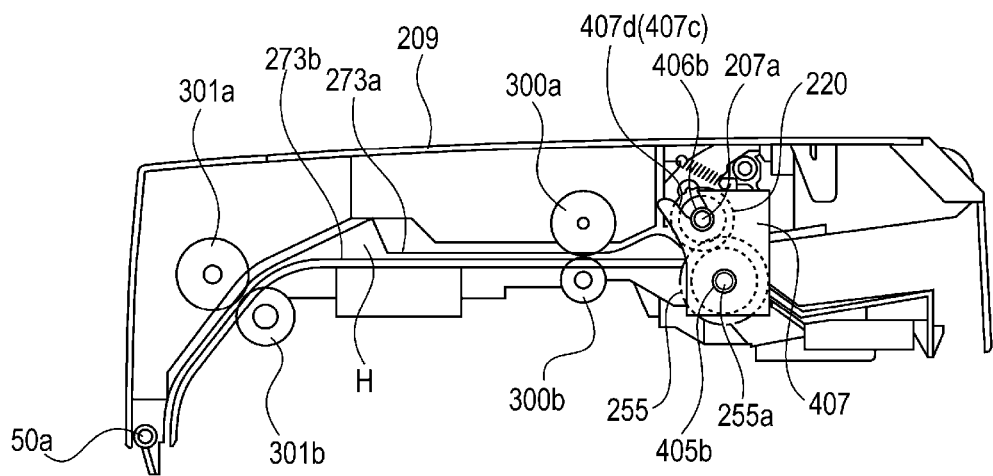
FIGS. 10A and 10B are each a cross-sectional view of the driving portion of the ADF.
Figure 10B:
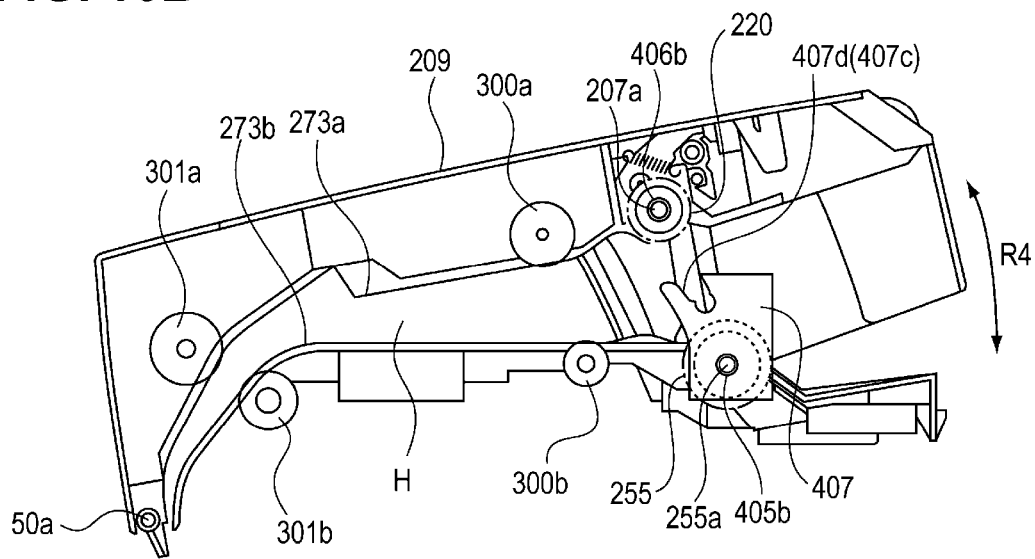
Figure 11:
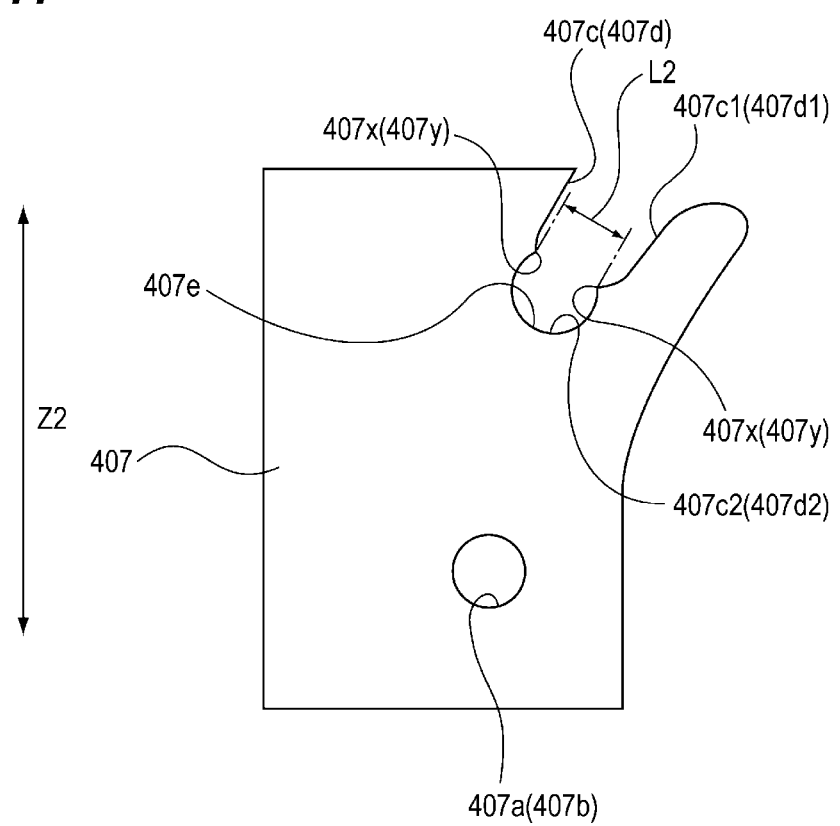
FIG. 11 is a front view of a holder member.
Figure 12A:
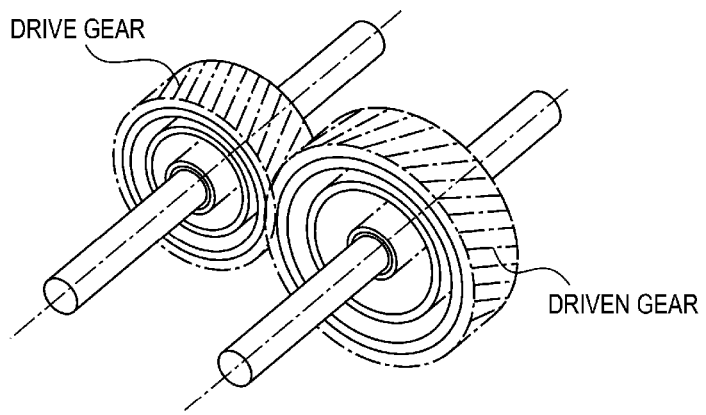
FIGS. 12A to 12C are each a perspective view illustrating a drive gear and a driven gear.
Figure 12B:
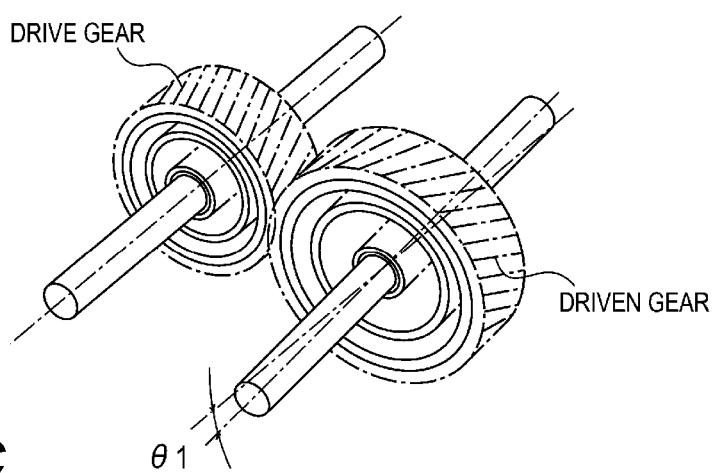
Figure 12C:
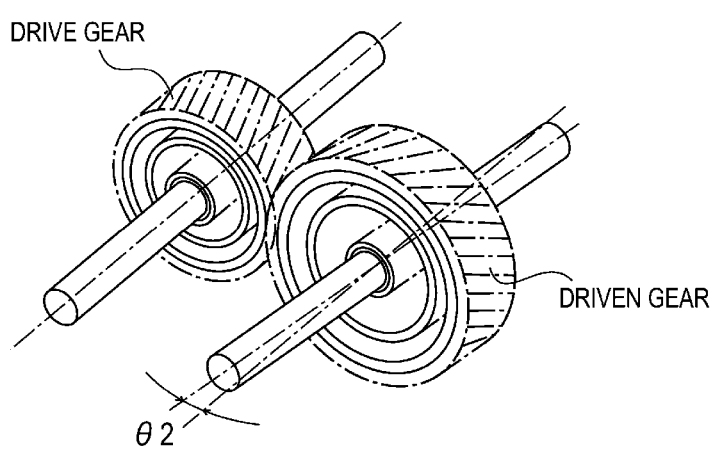

FIG. 9 is a perspective view of the driving portion of the ADF 82 when the opening/closing cover 209 is positioned at the close position. FIGS. 10A and 10B are each a cross-sectional view of the driving portion of the ADF 82. Here, FIG. 10A illustrates a state where the opening/closing cover 209 is positioned at the open position, and FIG. 10B illustrates a state where the opening/closing cover 209 is positioned at the close position. FIG. 11 is a front view of a holder member 407.

As illustrated in FIG. 9, a motor 230 is provided in the ADF 82. A rotating belt 254 is wound around a rotation shaft 230a of the motor 230 and a rotation shaft 301b1 of the registration roller 301b. Therefore, a driving force of the motor 230 is transmitted to the rotation shaft 301b1 of the registration roller 301b via the rotating belt 254.

Further, a fifth gear 253 is attached to the rotation shaft 301b1 of the registration roller 301b. The fifth gear 253 meshes with a fourth gear 252a that is an idler gear attached to an idler shaft 252c. Further, a third gear 252b is attached to the idler shaft 252c coaxially with the fourth gear 252a.

The third gear 252b meshes with a first gear 255 that is an idler gear. The first gear 255 is rotatably supported by a rotation shaft 255a integrally formed with a lower guide plate 273b (FIGS. 10A and 10B) to be described later. Bearings 405a and 405b formed of a resin are attached to the rotation shaft 255a of the first gear 255.

In a rotational axis direction of the first gear 255, the bearing 405a (first bearing) is arranged adjacent to the first gear 255 on one side of the first gear 255, and the bearing 405b (second bearing) is arranged adjacent to the first gear 255 on the other side of the first gear 255. The bearings 405a and 405b are members that are concentric with the rotation shaft 255a of the first gear 255, an inner diameter of each of the bearings 405a and 405b is several μm larger than an outer diameter of the rotation shaft 255a, and an outer diameter of each of the bearings 405a and 405b is about twice as large as a base thickness from the inner diameter.

Further, the first gear 255 meshes with a second gear 220 attached to a rotation shaft 207a of the conveying roller 207. Bearings 406a and 406b formed of a resin are attached to the rotation shaft 207a of the conveying roller 207.

In a rotational axis direction of the second gear 220, the bearing 406a (third bearing) is arranged adjacent to the second gear 220 on one side of the second gear 220, and the bearing 406b (fourth bearing) is arranged adjacent to the second gear 220 on the other side of the second gear 220. The bearings 406a and 406b are members that are concentric with the rotation shaft 207a of the second gear 220, an inner diameter of each of the bearings 406a and 406b is several μm larger than an outer diameter of the rotation shaft 207a, and an outer diameter of each of the bearings 406a and 406b is about twice as large as a base thickness from the inner diameter.

When a current is supplied to the motor 230 in a state where the opening/closing cover 209 is positioned at the close position, the driving force of the motor 230 is sequentially transmitted to the rotating belt 254, the fourth gear 252a, the third gear 252b, the first gear 255, and the second gear 220. Once the driving force of the motor 230 is transmitted to the second gear 220, the rotation shaft 207a of the conveying roller 207 to which the second gear 220 is attached rotates.

Further, pulleys 223a and 223b are attached to the rotation shaft 207a of the conveying roller 207 and a rotation shaft 203a of the feeding roller 203, respectively. A rotating belt 225 is wound around the pulleys 223a and 223b. The driving force of the motor 230 transmitted to the rotation shaft 207a of the conveying roller 207 is transmitted to the rotation shaft 203a of the feeding roller 203 via the pulleys 223a and 223b and the rotating belt 225.

As illustrated in FIGS. 10A and 10B, the ADF 82 includes an upper guide plate 273a and the lower guide plate 273b, and the upper guide plate 273a and the lower guide plate 273b form a conveyance path H for conveying the sheet S which is an original. The upper guide plate 273a is supported by the opening/closing cover 209. Further, the rotation shaft 255a that axially supports the first gear 255 is integrally formed with the lower guide plate 273b.

When the opening/closing cover 209 rotates from the close position to the open position, the upper guide plate 273a rotates together, and the conveyance path H from the original tray 251 to the contact glass 303 is exposed. The user can easily remove the sheet S that remains in the conveyance path H and causes the jam, by positioning the opening/closing cover 209 at the open position as described above.

Here, since the conveying roller 207 is supported by the opening/closing cover 209 as described above, when the opening/closing cover 209 is positioned at the open position (second position), the second gear 220 is separated from the first gear 255 to be a state where the second gear 220 and the first gear 255 do not mesh with each other, such that the driving force cannot be transmitted. On the other hand, when the opening/closing cover 209 is positioned at the close position (first position), the second gear 220 and the first gear 255 mesh with each other, and the driving force of the motor 230 is transmitted from the first gear 255 to the second gear 220, such that the conveying roller 207 rotates.

It is not easy to ensure position accuracy of the opening/closing cover 209 with respect to the housing 50 due to a backlash of a rotating portion of the opening/closing cover 209 or variation in size. Therefore, it is not easy to ensure a degree of parallelization of the rotation shaft 255a of the first gear 255 and the rotation shaft 207a of the conveying roller 207. In a case where the degree of parallelization of the rotation shaft 255a of the first gear 255 and the rotation shaft 207a of the conveying roller 207 is not ensured, the above-described meshing error or parallelization error may occur between the first gear 255 and the second gear 220. Therefore, in the present embodiment, the holder member 407 (holding member) suppresses deterioration in the degree of parallelization of the rotation shaft 255a of the first gear 255 and the rotation shaft 207a of the conveying roller 207.

As illustrated in FIG. 11, the holder member 407 is a resin member provided in the housing 50 and formed of a polyacetal resin (POM) or an acrylonitrile butadiene styrene (ABS) resin. The holder member 407 has two fitting holes 407a and 407b (first fitting hole and second fitting hole) into which the bearings 405a and 405b supporting the rotation shaft 255a of the first gear 255 are fitted, respectively. Further, the holder member 407 has two fitting grooves 407c and 407d (first groove portion and second groove portion) into which the bearings 406a and 406b supporting the rotation shaft 207a of the conveying roller 207 are fitted, respectively.

As described above, the rotation shaft 207a of the second gear 220 is supported by the opening/closing cover 209. Therefore, the bearings 406a and 406b attached to the rotation shaft 207a of the second gear 220 rotate by the rotation of the opening/closing cover 209, together with the rotation shaft 207a of the second gear 220, in a state where the rotation shaft 207a of the second gear 220 is inserted into openings of the bearings 406a and 406b. The fitting groove 407c is a groove that is formed on a movement locus of the bearing 406a moving by the rotation of the opening/closing cover 209, and extends in a rotation direction of the opening/closing cover 209. The fitting groove 407d is a groove that is formed on the movement locus of the bearing 406b moving by the rotation of the opening/closing cover 209, and extends in the rotation direction of the opening/closing cover 209. The fitting grooves 407c and 407d can also be referred to as recess portions that are recessed in the rotation direction of the opening/closing cover 209 from a surface of the holder member 407 that faces opening/closing cover 209.

The bearings 405a and 405b and the bearings 406a and 406b are fitted into the fitting holes 407a and 407b and the fitting grooves 407c and 407d, respectively, such that the bearings 405a and 405b and the bearings 406a and 406b are held by the holder member 407. When the motor 230 is driven in a state where the bearings 405a and 405b and the bearings 406a and 406b are held by the holder member 407, the rotation shaft 255a and the rotation shaft 207a rotate, and the bearings 405a and 405b and the bearings 406a and 406b do not rotate.

Further, an inclined portion 407c1 (first inclined portion) of which width in a direction (direction of Arrow Z2) orthogonal to the rotation direction of the opening/closing cover 209 and a rotational axis direction of the second gear 220 is decreased toward a back side of the fitting groove 407c is provided adjacent to an opening of the fitting groove 407c. In addition, an arc-shaped positioning portion 407c2 which positions the bearing 406a is provided behind the inclined portion 407c1.

In the fitting groove 407c, two protrusions 407x (first protrusions) protruding in the direction of Arrow Z2 are provided at portions between the inclined portion 407c1 and the positioning portion 407c2. A distance L2 in the direction of Arrow Z2 that connects vertices of the two protrusions 407x is several mm smaller than the outer diameter of the bearing 406a. Therefore, in a process in which the opening/closing cover 209 moves from the open position to the close position, the bearing 406a is fitted into the fitting groove 407c as follows.

That is, when entering the fitting groove 407c as illustrated in FIG. 10A, the bearing 406a first passes through the inclined portion 407c1. Here, even in a case where a position of the bearing 406a is slightly shifted due to the influence of tolerance or the like, the bearing 406a is guided to the inside of the fitting groove 407c by abutting on the inclined portion 407c1.

Next, the bearing 406a comes into contact with the protrusions 407x provided in the fitting groove 407c, and presses the protrusions 407x toward the inner side of the fitting groove 407c. As a result, the protrusions 407x are elastically deformed and the distance L2 is expanded, such that the bearing 406a passes through the vertices of the protrusions 407x. Then, when the opening/closing cover 209 moves to the close position, the bearing 406a abuts on an abutting surface 407e of the fitting groove 407c, and is fitted and held at a predetermined position between the abutting surface 407e and the two protrusions 407x in the positioning portion 407c2.

Note that, in a process in which the opening/closing cover 209 moves from the close position to the open position, an operation reverse to the above-described operation is performed. The configuration of the fitting groove 407c has been described here, and the fitting groove 407d has the same configuration. That is, since the fitting groove 407d has the same shape as that of the fitting groove 407c, the fitting groove 407d has an inclined portion 407d1 (second inclined portion), a positioning portion 407d2, and protrusions 407y (second protrusions), similarly to the fitting groove 407c.

As described above, the holder member 407 integrally holds the bearing 405a arranged on one side of the first gear 255 in a rotational axis direction of the first gear 255 and the bearing 405b arranged on the other side of the first gear 255 at predetermined positions. Further, the holder member 407 integrally holds the bearing 406a arranged on one side of the second gear 220 in a rotational axis direction of the second gear 220 and the bearing 406b arranged on the other side of the second gear 220 at predetermined positions. As a result, it is possible to suppress deterioration in the degree of parallelization of the rotation shaft 255a supported by the bearings 405a and 405b and axially supporting the first gear 255, and the rotation shaft 207a of the conveying roller 207 supported by the bearings 406a and 406b and axially supporting the second gear 220. Therefore, it is possible to suppress the occurrence of the above-described meshing error and parallelization error between the first gear 255 and the second gear 220, and it is possible to suppress uneven wear between the first gear 255 and the second gear 220, a driving force transmission error, and abnormal noise.

The protrusions 407x and 407y prevents the bearings 406a and 406b fitted into the fitting grooves 407c and 407d, respectively, from moving in a direction of movement of the opening/closing cover 209 from the close position to the open position, respectively, when the opening/closing cover 209 is positioned at the close position, by abutting on the bearings 406a and 406b, respectively. Therefore, the bearings 406a and 406b are prevented from moving in the fitting grooves 407c and 407d, respectively, when the opening/closing cover 209 is positioned at the close position. Accordingly, it is possible to more effectively suppress the deterioration in the degree of parallelization of the rotation shaft 255a of the first gear 255 and the rotation shaft 207a of the conveying roller 207.

In the present embodiment, the configuration in which the holder member 407 is provided in the housing 50 has been described, but the present invention is not limited thereto. That is, the holder member 407 may be provided on the opening/closing cover 209. In this case, the bearings 406a and 406b supporting the rotation shaft 207a of the conveying roller 207 are fitted into the fitting holes 407a and 407b, respectively. Further, the bearings 405a and 405b supporting the rotation shaft 255a of the first gear 255 are fitted into the fitting grooves 407c and 407d, respectively. As a result, the same effect as described above can be obtained.

Further, although two protrusions are provided in each of the fitting grooves 407c and 407d in the present embodiment, only one protrusion may be provided on the movement locus of the opening/closing cover 209, or three or more protrusions may be provided. That is, as long as the bearings 406a and 406b fitted into the fitting grooves 407c and 407d, respectively, can be prevented from moving in the direction of the movement of the opening/closing cover 209 from the close position to the open position when the opening/closing cover 209 is positioned at the close position, the number of protrusions may be changed as appropriate.

Further, in the present embodiment, a configuration in which the rotation shaft 255a of the first gear 255 and the rotation shaft 207a of the second gear 220 are held by the holder member 407 via the bearings 405a and 405b and the bearings 406a and 406b. However, the present invention is not limited thereto. That is, in a configuration in which the first gear 255 or the second gear 220 is held so as to be rotatable with respect to each rotation shaft thereof, the rotation shaft 255a of the first gear 255 or the rotation shaft 207a of the second gear 220 may be directly held by the holder member 407 without using the bearings. In this case, a portion (first portion) on one side of the rotation shaft 255a of the first gear 255 with respect to the first gear 255 in the rotational axis direction of the first gear 255 is held by the fitting hole 407a, and a portion (second portion) on the other side is held by the fitting hole 407b. Further, a portion (third portion) on one side of the rotation shaft 207a of the second gear 220 with respect to the second gear 220 in the rotational axis direction of the second gear 220 is held by the fitting groove 407c, and a portion (fourth portion) on the other side is held by the fitting groove 407d. As a result, the same effect as described above can be obtained.

Second Embodiment

Next, a configuration of an image forming apparatus according to a second embodiment of the present invention will be described. The same portions as those in the first embodiment will be denoted by the same reference numerals, and a description thereof will be omitted.

<Driving Portion>

A configuration of a driving portion that drives a conveying roller 42 in the present embodiment will be described. Conveying rollers 41 and 43 are also driven in the same manner as that of the conveying roller 42.

Figure 13:
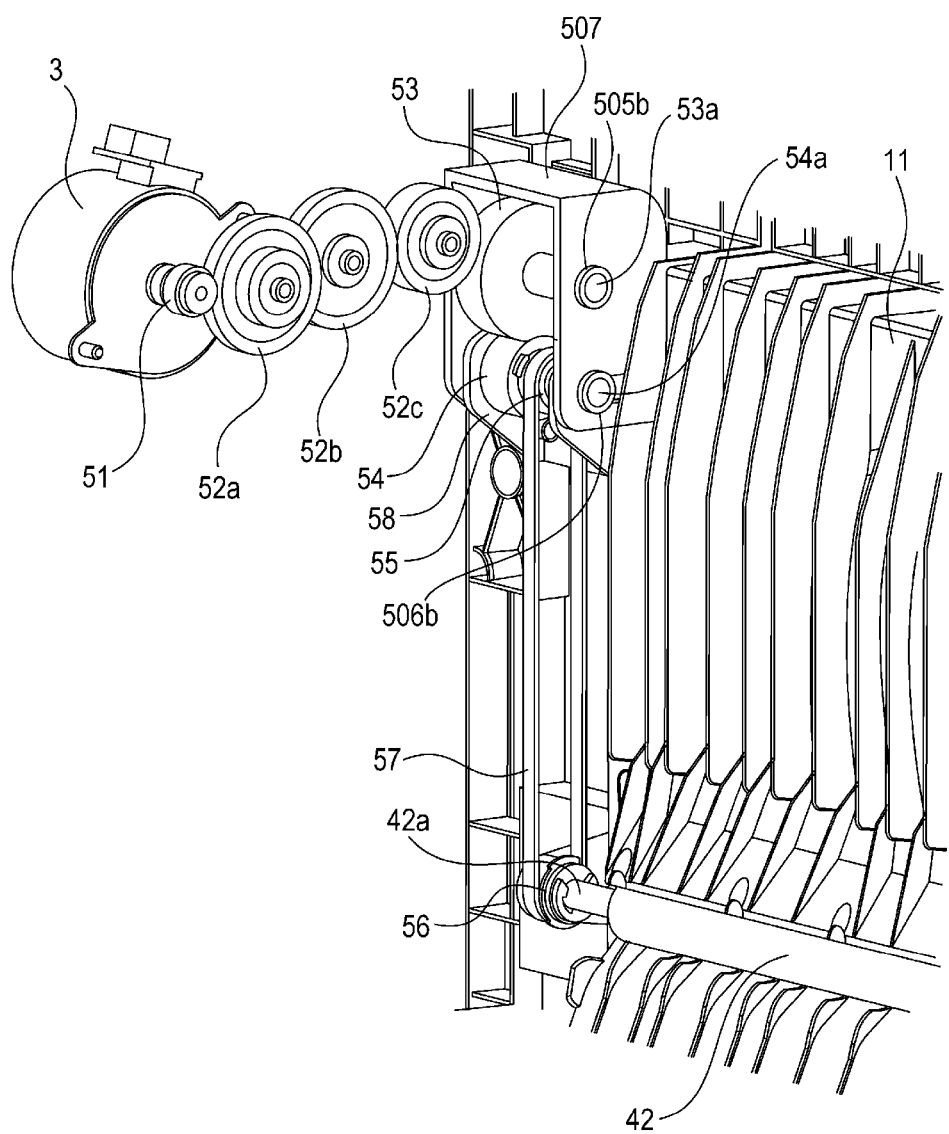
FIG. 13 is a schematic view of a driving portion that drives a conveying roller.

FIG. 13 is a schematic perspective view of the driving portion that drives the conveying roller 42. In FIG. 13, a right door 11 is positioned at a close position at which the right door 11 closed with respect to a housing 1 is positioned. As illustrated in FIG. 13, a motor 3 is provided in the housing 1. A pinion gear 51 is press-fitted onto a rotation shaft of the motor 3.

Further, an idler gear 52a meshing with the pinion gear 51, an idler gear 52b meshing with the idler gear 52a, an idler gear 52c meshing with the idler gear 52b, and a drive gear 53 (first gear) meshing with the idler gear 52c are provided in the housing 1. Thereby, a driving force of the motor 3 is transmitted to the drive gear 53 via the pinion gear 51 and the idler gears 52a to 52c. Note that the motor 3 or the idler gears 52a to 52c are fixed to a sheet metal serving as a frame of the housing 1.

Further, bearings 505a and 505b (see FIGS. 14A to 14C) formed of a resin are attached to a rotation shaft 53a of the drive gear 53. In a rotational axis direction of the drive gear 53, the bearing 505a (first bearing) is arranged adjacent to the drive gear 53 on one side of the drive gear 53, and the bearing 505b (second bearing) is arranged adjacent to the drive gear 53 on the other side of the drive gear 53. Although the drive gear 53 and the rotation shaft 53a thereof are integrally formed in the present embodiment, the drive gear 53 and the rotation shaft 53a thereof may be formed as separate members.

Further, the right door 11 supports a driven gear 54 (second gear) that meshes with the drive gear 53 when the right door 11 is positioned at the close position. A pulley 55 is attached to a rotation shaft 54a of the driven gear 54. Further, a pulley 56 is attached to one end portion of a rotation shaft 42a of the conveying roller 42 supported by the right door 11. A driving force transmission belt 57 is stretched over the pulleys 55 and 56. Thereby, the driving force of the motor 3 transmitted to the driven gear 54 via the drive gear 53 is transmitted to the conveying roller 42 via the driving force transmission belt 57.

Further, bearings 506a and 506b (see FIGS. 14A to 14C) formed of a resin are attached to the rotation shaft 54a of the driven gear 54. In a rotational axis direction of the driven gear 54, the bearing 506a (third bearing) is arranged adjacent to the driven gear 54 on one side of the driven gear 54, and the bearing 506b (fourth bearing) is arranged adjacent to the driven gear 54 on the other side of the driven gear 54. Although the driven gear 54 and the rotation shaft 54a thereof are integrally formed in the present embodiment, the driven gear 54 and the rotation shaft 54a thereof may be formed as separate members.

As described above, since the conveying roller 42 or the driven gear 54 is supported by the right door 11, when the right door 11 is positioned at the open position (second position), the driven gear 54 is separated from the drive gear 53 to be a state where the driven gear 54 and the drive gear 53 do not mesh with each other, such that the driving force cannot be transmitted. On the other hand, when the right door 11 is positioned at the close position (first position), the driven gear 54 and the drive gear 53 mesh with each other, and the driving force of the motor 3 is transmitted from the drive gear 53 to the driven gear 54. That is, when the right door 11 is positioned at the close position, the driving force of the motor 3 is transmitted to the conveying roller 42 via the pinion gear 51, the idler gears 52a to 52c, the drive gear 53, the driven gear 54, and the driving force transmission belt 57, such that the conveying roller 42 rotates.

<Holder Member>

It is not easy to ensure position accuracy of the right door 11 with respect to the housing 1 due to a backlash of a rotating portion of the right door 11 or variation in size. Therefore, it is not easy to ensure a degree of parallelization of the rotation shaft 53a of the drive gear 53 and the rotation shaft 54a of the driven gear 54. In a case where the degree of parallelization of the rotation shaft 53a of the drive gear 53 and the rotation shaft 54a of the driven gear 54 is not ensured, the above-described meshing error or parallelization error may occur between the drive gear 53 and the driven gear 54. Therefore, in the present embodiment, the deterioration in the degree of parallelization of the rotation shaft 53a of the drive gear 53 and the rotation shaft 54a of the driven gear 54 is suppressed by a holder member 507 and springs 9a and 9b held by a spring holding member 58. Hereinafter, configurations of the holder member 507 and the springs 9a and 9b held by the spring holding member 58 will be described.

FIGS. 14A to 14C are each a view illustrating configurations of the holder member 507, the drive gear 53, and the driven gear 54 when the right door 11 is positioned at the close position. FIG. 14A is a left side view, FIG. 14B is a front view, and FIG. 14C is a right side view. FIGS. 15A and 15B are each a schematic cross-sectional view illustrating a region around the holder member 507. Here, FIG. 15A illustrates a state where the right door 11 is positioned at the close position, and FIG. 15B illustrates a state where the right door 11 is positioned at the open position. FIG. 16 is a perspective view illustrating the spring holding member 58 and the driven gear 54.

Figure 14:
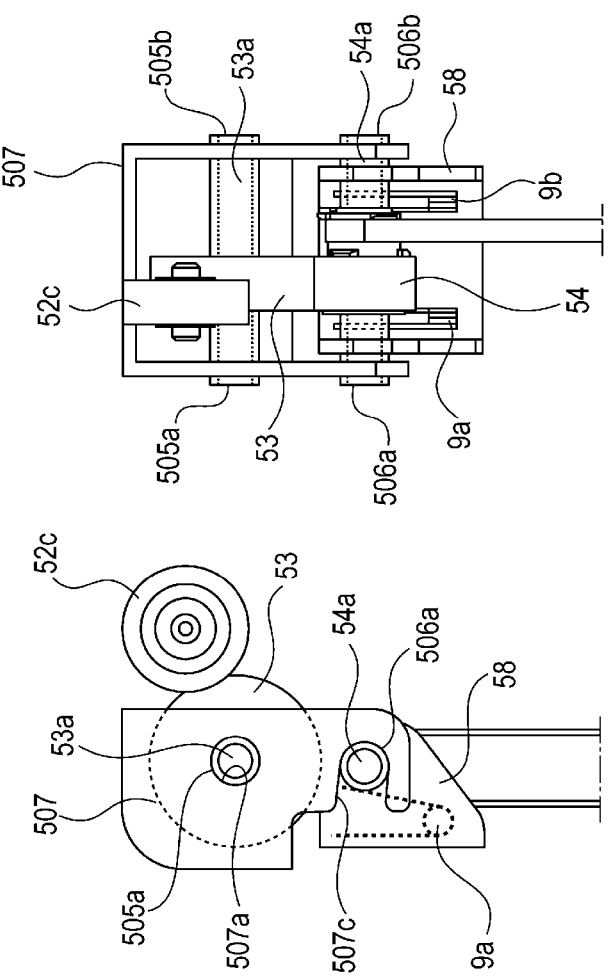
FIGS. 14A to 14C are a front view and side views illustrating a holder member, a drive gear, and a driven gear.
Figure 15:
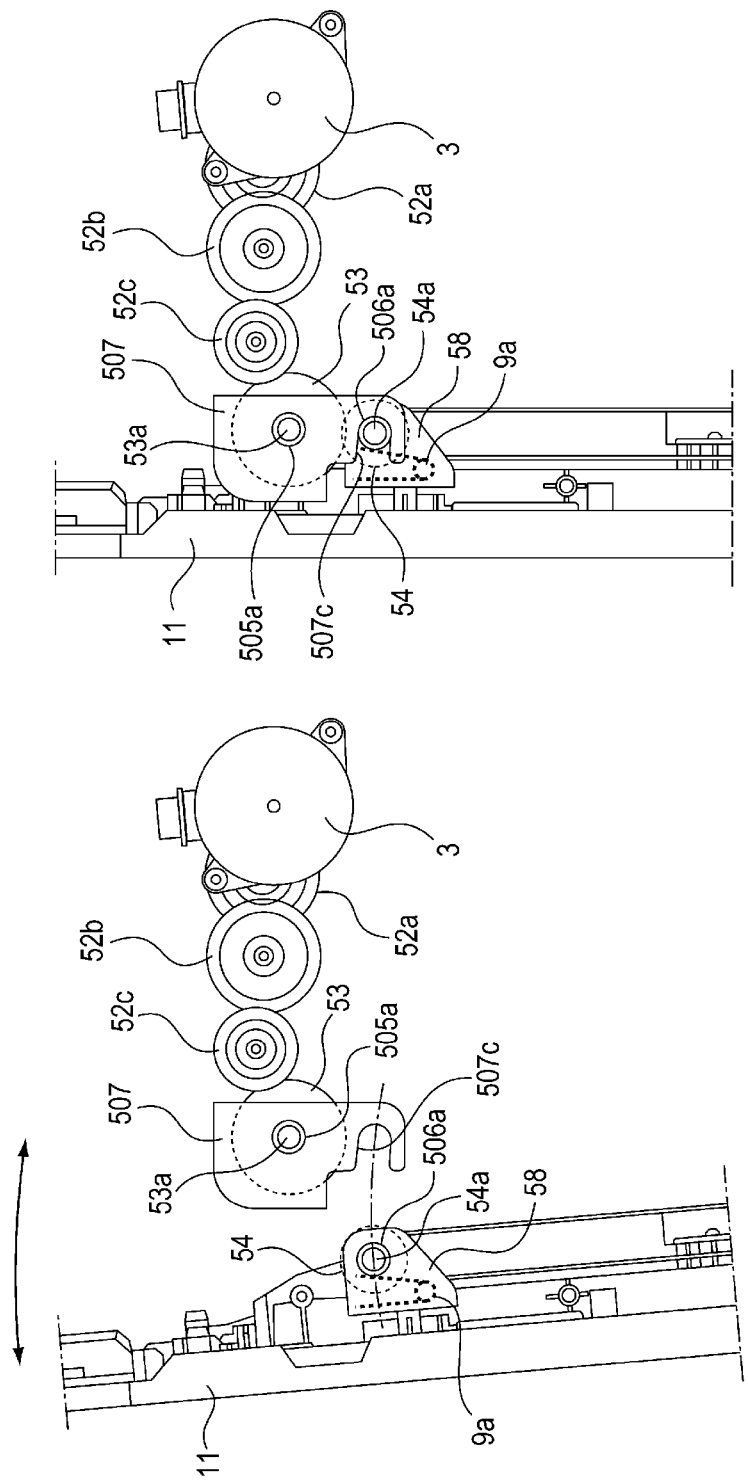
FIGS. 15A and 15B are each a schematic cross-sectional view illustrating a region around the holder member.
Figure 16:
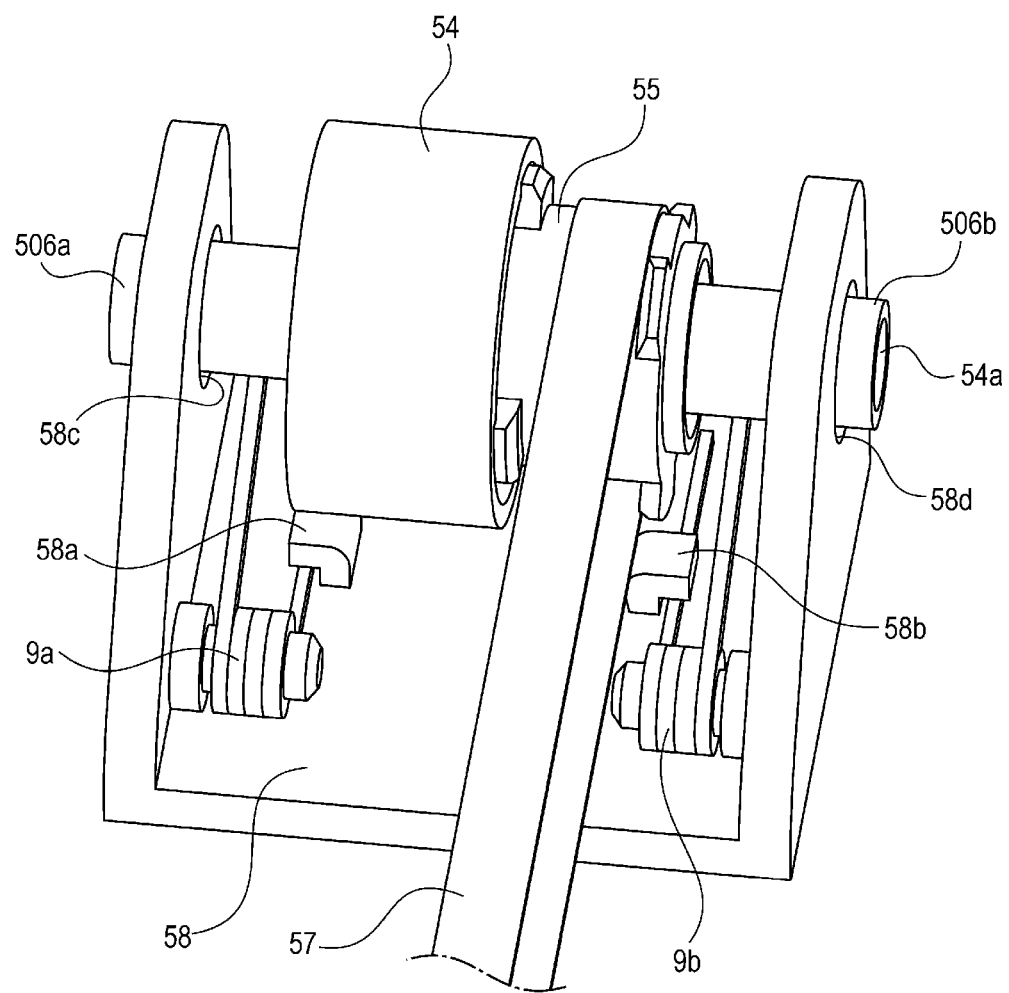
FIG. 16 is a perspective view illustrating a spring holding member and the driven gear.

As illustrated in FIGS. 13 to 15, the holder member 507 (holding member) is a resin member provided in the housing 1 and formed of a polyacetal resin (POM) or an ABS resin. The holder member 507 has fitting holes 507a and 507b (first fitting hole and second fitting hole) into which the bearings 505a and 505b attached to the rotation shaft 53a of the drive gear 53 are fitted, respectively. Further, the holder member 507 has fitting grooves 507c and 507d (first fitting groove portion and second fitting groove portion) into which the bearings 506a and 506b attached to the rotation shaft 54a of the driven gear 54 are fitted, respectively.

As described above, the driven gear 54 is supported by the right door 11. Therefore, the bearings 506a and 506b attached to the rotation shaft 54a of the driven gear 54 rotate by the rotation of the right door 11, together with the rotation shaft 54a of the driven gear 54, in a state where the rotation shaft 54a of the driven gear 54 is inserted into openings of the bearings 506a and 506b. The fitting groove 507c of the holder member 507 is a groove that is formed on a movement locus of the bearing 506a moving by the rotation of the right door 11, and extends in a rotation direction of the right door 11. The fitting groove 507d is a groove that is formed on a movement locus of the bearing 506b moving by the rotation of the right door 11, and extends in the rotation direction of the right door 11. The fitting grooves 507c and 507d can also be referred to as recess portions that are recessed in the rotation direction of the right door 11 from a surface of the holder member 507 that faces the right door 11.

Further, the spring holding member 58 (another holding member) that holds the springs 9a and 9b, which are torsion coil springs, is provided on the right door 11. As illustrated in FIG. 16, the spring holding member 58 has projection portions 58a and 58b and through holes 58c and 58d. The bearings 506a and 506b attached to the rotation shaft 54a of the driven gear 54 are inserted into and fitted into the through holes 58c and 58d (first hole and second hole), respectively. That is, the spring holding member 58 holds the rotation shaft 54a of the driven gear 54 via the bearings 506a and 506b. Since diameters of the through holes 58c and 58d are about 1 mm larger than diameters of the bearings 506a and 506b, respectively, the bearings 506a and 506b are loosely fitted into the through holes 58c and 58d, respectively. The bearings 506a and 506b are fitted into the fitting grooves 507c and 507d, respectively, at portions closer to end portions of the rotation shaft 54a of the driven gear 54 than portions at which the bearings 506a and 506b are loosely fitted into the through holes 58c and 58d, respectively.

The spring 9a (first biasing member) is fitted into the projection portion 58a of the spring holding member 58, whereby one end portion of the spring 9a is held by the spring holding member 58. The other end portion of the spring 9a is in contact with the bearing 506a and applies a force to the bearing 506a. Similarly, the spring 9b (second biasing member) is fitted into the projection portion 58b of the spring holding member 58, whereby one end portion of the spring 9b is held by the spring holding member 58. The other end portion of the spring 9b is in contact with the bearing 506b and applies a force to the bearing 506b. When the right door 11 is positioned at the close position, the spring 9a applies a force to the bearing 506b together with the rotation shaft 54a of the driven gear 54 toward the back side of the fitting groove 507c, and the spring 9b applies a force to the bearing 506b together with the rotation shaft 54a of the driven gear 54 toward the back side of the fitting groove 507d.

That is, in the present embodiment, the springs 9a and 9b and the bearings 506a and 506b are integrally held by the spring holding member 58. However, the present invention is not limited thereto. For example, a through hole into which the bearings 506a and 506b are loosely fitted or a portion holding the springs 9a and 9b may be provided in the right door 11. Further, as long as a degree of freedom of movement of the rotation shaft 54a of the driven gear 54 is ensured, the bearings 506a and 506b may be loosely fitted and held, or the rotation shaft 54a of the driven gear 54 may be held directly.

As illustrated in FIG. 15A, when the right door 11 is positioned at the open position, the bearings 506a and 506b attached to the rotation shaft 54a of the driven gear 54 are separated from the holder member 507, and thus the bearings 506a and 506b are not held by the holder member 507. On the other hand, the bearings 505a and 505b attached to the rotation shaft 53a of the drive gear 53 are fitted into and held by the fitting holes 507a and 507b of the holder member 507, respectively. In this state, the drive gear 53 and the driven gear 54 do not mesh with each other.

In a process in which the right door 11 moves from the open position to the close position, the bearings 506a and 506b attached to the rotation shaft 54a of the driven gear 54 enter the inside of the fitting grooves 507c and 507d while being guided by inner walls of the fitting grooves 507c and 507d, respectively. Thereafter, as illustrated in FIG. 15B, the bearings 506a and 506b abut on inner walls on the back side of the fitting grooves 507c and 507d, and are fitted into and held by the fitting grooves 507c and 507d, respectively, when the right door 11 moves to the close position.

Further, when the bearing 506a is fitted into the fitting groove 507c, the spring 9a applies a force to the bearing 506a toward the back side of the fitting groove 507c. Similarly, when the bearing 506b is fitted into the fitting groove 507d, the spring 9b applies a force to the bearing 506b toward the back side of the fitting groove 507d. When the motor 3 is driven in a state where the bearings 505a and 505b and the bearings 506a and 506b are held by the holder member 507, the bearings 505a and 505b and the bearings 506a and 506b are held by the holder member 507 in a non-rotating state, and the rotation shaft 53a of the drive gear 53 and the rotation shaft 54a of the driven gear 54 rotate.

As described above, the holder member 507 integrally holds the bearing 505a arranged on one side of the drive gear 53 in the rotational axis direction of the drive gear 53, and the bearing 505b arranged on the other side of the drive gear 53 at predetermined positions. Further, the holder member 507 integrally holds the bearing 506a arranged on one side of the driven gear 54 in the rotational axis direction of the driven gear 54, and the bearing 506b arranged on the other side of the driven gear 54 at predetermined positions. As a result, it is possible to suppress the deterioration in the degree of parallelization of the rotation shaft 53a of the drive gear 53 to which the bearings 505a and 505b are attached and the rotation shaft 54a of the driven gear 54 to which the bearings 506a and 506b are attached. Therefore, it is possible to suppress the occurrence of the above-described meshing error and parallelization error between the drive gear 53 and the driven gear 54, and it is possible to suppress uneven wear between the drive gear 53 and the driven gear 54, a driving force transmission error, and abnormal noise.

When the right door 11 is positioned at the close position, the spring 9a applies a force to the bearing 506a attached to the rotation shaft 54a of the driven gear 54 toward the back side of the fitting groove 507c. Similarly, the spring 9b applies a force to the bearing 506b attached to the rotation shaft 54a of the driven gear 54 toward the back side of the fitting groove 507d. Thereby, the rotation shaft 54a of the driven gear 54 is prevented from moving in a direction of the movement of the right door 11 from the close position to the open position. Accordingly, when the right door 11 is positioned at the close position, the rotation shaft 54a of the driven gear 54 is prevented from moving inside the fitting grooves 507c and 507d, and the degree of parallelization of the rotation shaft 53a of the drive gear 53 and the rotation shaft 54a of the driven gear 54 can be more effectively suppressed.

Meanwhile, there is a possibility that, when the right door 11 moves from the open position to the close position, the bearings 506a and 506b reach the inner walls on the back side of the fitting grooves 507c and 507d, respectively, before the right door 11 reaches the close position, due to the influence of the tolerance of the holder member 507, or the like, such that the right door 11 is not completely closed. In the present embodiment, since the diameters of the through holes 58c and 58d are about 1 mm larger than the diameters of the bearings 506a and 506b, respectively, in such a case, the right door 11 can move together with the spring holding member 58 by about 1 mm toward the close position. Therefore, it is possible to prevent the right door 11 from being unable to move to the close position.

The configuration in which the rotation shaft 53a of the drive gear 53 and the rotation shaft 54a of the driven gear 54 are held by the holder member 507 via the bearings 505a and 505b and the bearings 506a and 506b has been described in the present embodiment. However, the present invention is not limited thereto. That is, in a configuration in which the drive gear 53 or the driven gear 54 is held so as to be rotatable with respect to each rotation shaft thereof, for example, an idler gear, the rotation shaft 53a of the drive gear 53 or the rotation shaft 54a of the driven gear 54 may be directly held by the holder member 507 without using the bearings. In this case, a portion (first portion) on one side of the rotation shaft 53a of the drive gear 53 with respect to the drive gear 53 in the rotational axis direction of the drive gear 53 is held by the fitting hole 507a, and a portion (second portion) on the other side is held by the fitting hole 507b. Further, a portion (third portion) on one side of the rotation shaft 54a of the driven gear 54 with respect to the driven gear 54 in the rotational axis direction of the driven gear 54 is held by the fitting groove 507c, and a portion (fourth portion) on the other side is held by the fitting groove 507d. The springs 9a and 9b are provided so as to be in direct contact with the rotation shaft 54a of the driven gear 54. As a result, the same effect as described above can be obtained.

Figure 17A:
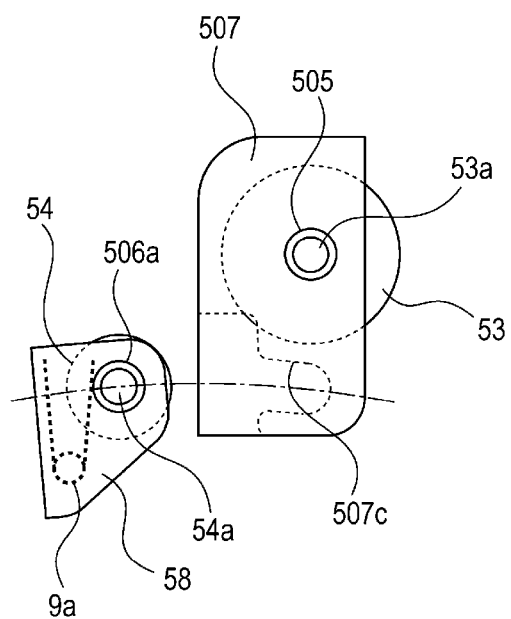
FIGS. 17A and 17B are each a view illustrating another configuration of the holder member.
Figure 17B:
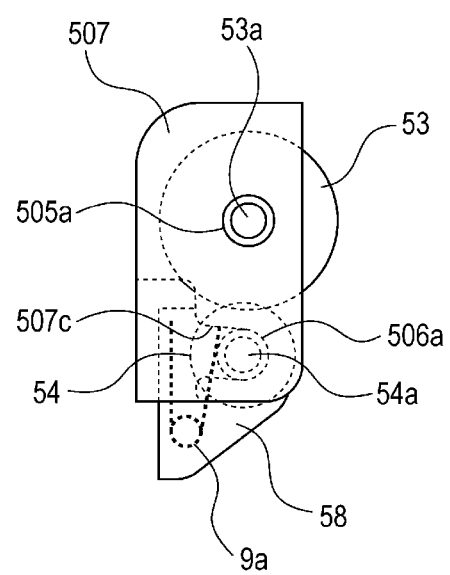

Further, the configuration in which the fitting grooves 507c and 507d of the holder member 507 penetrate in the rotational axis direction of the driven gear 54 has been described in the present embodiment, but the present invention is not limited thereto. That is, the same effect as described above can be obtained even with a configuration in which a wall is provided in each of the fitting grooves 507c and 507d of the holder member 507 so as to be adjacent to an end portion of the rotation shaft 54a of the driven gear 54, as illustrated in FIGS. 17A and 17B.

<Image Reading Apparatus>

Next, a configuration of the image reading apparatus 80 will be described.

Figure 18:
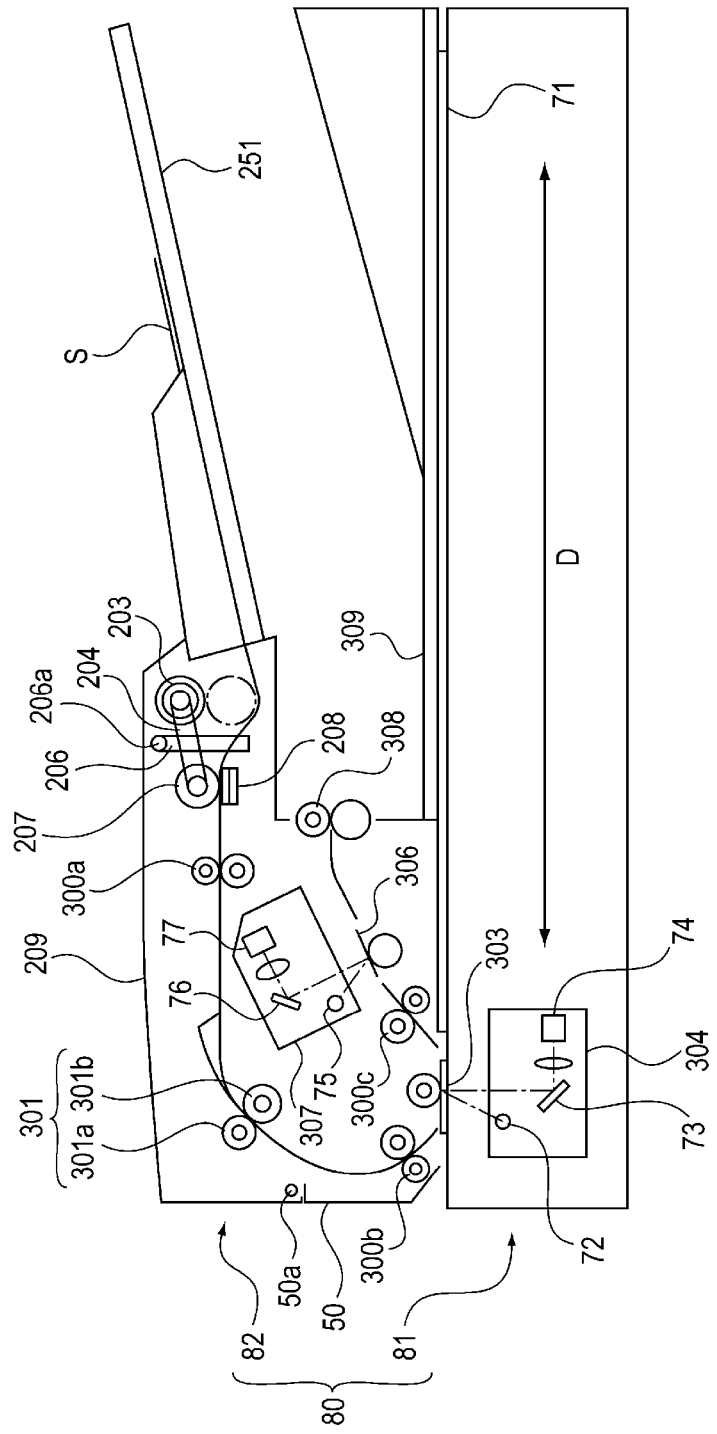
FIG. 18 is a schematic cross-sectional view of an image reading apparatus.

FIG. 18 is a schematic cross-sectional view of an image reading apparatus 80. As illustrated in FIG. 18, the image reading apparatus 80 of the present embodiment differs from the image reading apparatus 80 of the first embodiment illustrated in FIG. 8 in that the image reading apparatus 80 of the present embodiment includes springs 8a and 8b illustrated in FIG. 19.

<Driving Portion>

Next, a configuration of a driving portion of the ADF 82 will be described.

Figure 19:
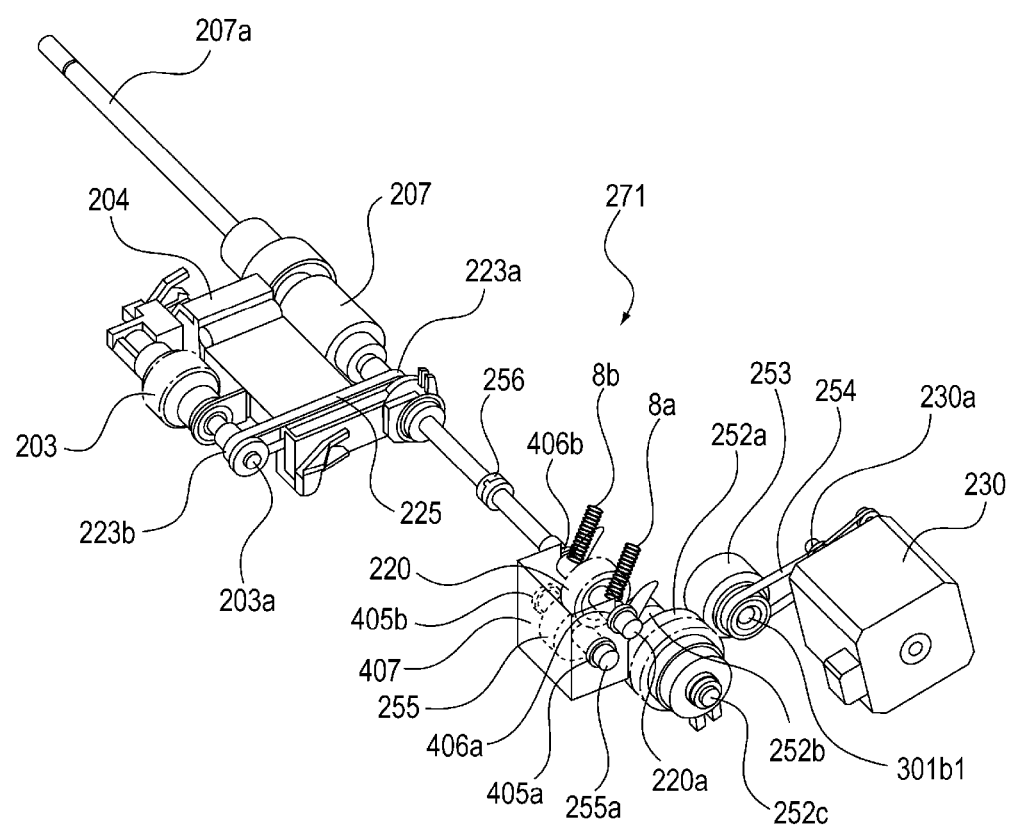
FIG. 19 is a perspective view of a driving portion of an ADF.
Figure 20A:
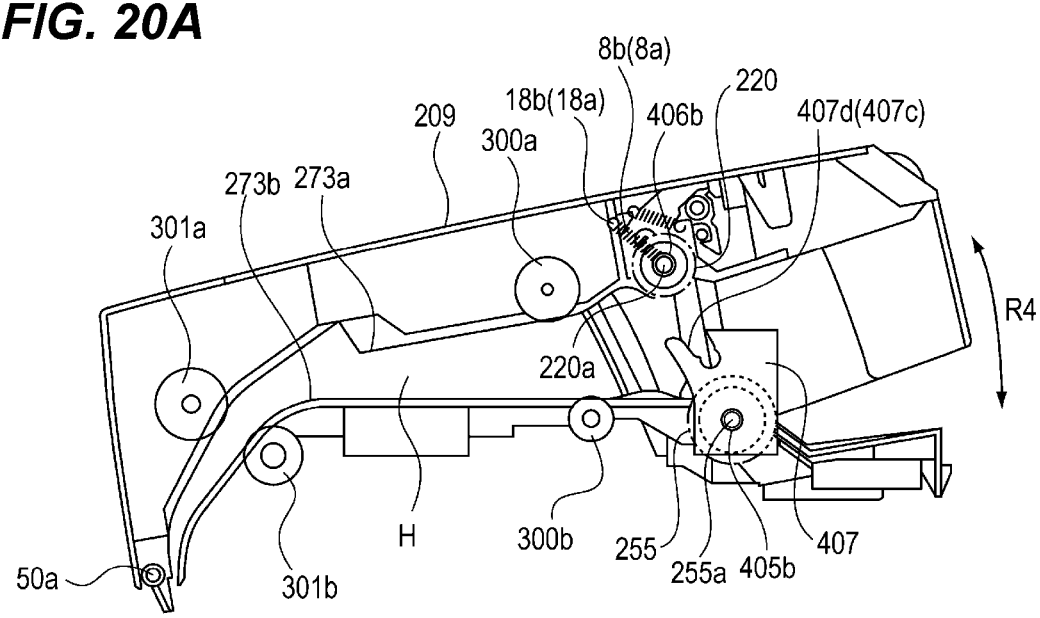
FIGS. 20A and 20B are each a cross-sectional view of the driving portion of the ADF.
Figure 20B:
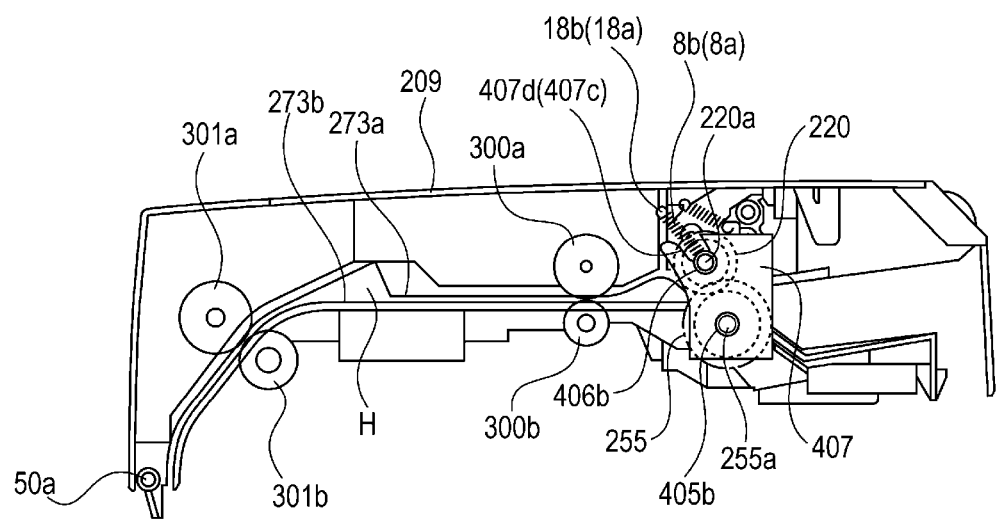

FIG. 19 is a perspective view of the driving portion of the ADF 82 when an opening/closing cover 209 is positioned at a close position. FIGS. 20A and 20B are each a cross-sectional view of the driving portion of the ADF 82. Here, FIG. 20A illustrates a state where the opening/closing cover 209 is positioned at an open position, and FIG. 20B illustrates a state where the opening/closing cover 209 is positioned at the close position.

As illustrated in FIG. 19, a motor 230 is provided in a housing 50 of the ADF 82. A rotating belt 254 is wound around a rotation shaft 230a of the motor 230 and a rotation shaft 301b1 of the registration roller 301b. Therefore, a driving force of the motor 230 is transmitted to the rotation shaft 301b1 of the registration roller 301b via the rotating belt 254.

Further, an idler gear 253 is attached to a rotation shaft 301b1 of a registration roller 301b. The idler gear 253 meshes with an idler gear 252a attached to an idler shaft 252c. Further, an idler gear 252b is attached to the idler shaft 252c coaxially with the idler gear 252a.

The idler gear 252b meshes with a drive gear 255 (first gear). Bearings 405a and 405b formed of a resin are attached to a rotation shaft 255a of the drive gear 255. The bearing 405a is arranged on one side of the drive gear 255 in a rotational axis direction of the drive gear 255, and the bearing 405b is arranged on the other side of the drive gear 255. Note that the rotation shaft 255a of the drive gear 255 is formed integrally with a lower guide plate 273b (FIGS. 20A and 20B) to be described later supported by the housing 50 of the ADF 82.

When the opening/closing cover 209 is positioned at the close position, the drive gear 255 meshes with a driven gear 220 (second gear) supported by the opening/closing cover 209. Bearings 406a and 406b formed of a resin are attached to a rotation shaft 220a of the driven gear 220. The bearing 406a is arranged on one side of the driven gear 220 in a rotational axis direction of the driven gear 220, and the bearing 406b is arranged on the other side of the driven gear 220.

The rotation shaft 220a of the driven gear 220 is connected to a rotation shaft 207a of a conveying roller 207 by an Oldham coupling 256. One end portion of the rotation shaft 220a of the driven gear 220 and one end portion of the rotation shaft 207a of the conveying roller 207 are fitted into two through holes (not illustrated) formed in the opening/closing cover 209, respectively, and are held by the opening/closing cover 209. A diameter of each through hole (not illustrated) is about 1 mm larger than a diameter of the rotation shaft 220a of the driven gear 220 and the rotation shaft 207a of the conveying roller 207. Therefore, the rotation shaft 220a of the driven gear 220 and the rotation shaft 207a of the conveying roller 207 are loosely fitted into the through holes (not illustrated), respectively. That is, when the rotation shaft 207a of the conveying roller 207 is considered as a part of the rotation shaft 220a of the driven gear 220, one end portion and the other end portion of the rotation shaft 207a of the conveying roller 207 with respect to the driven gear 220 are loosely fitted into the through holes of the opening/closing cover 209, respectively. Note that as long as a degree of freedom of movement of the rotation shaft 220a of the driven gear 220 is ensured, the bearings 406a and 406b attached to the rotation shaft 220a of the driven gear 220 may be loosely fitted into the opening/closing cover 209.

When a current is supplied to the motor 230 in a state where the opening/closing cover 209 is positioned at the close position, the driving force of the motor 230 is sequentially transmitted to a rotating belt 254, the idler gear 252a, the idler gear 252b, the drive gear 255, and the driven gear 220. When the driving force of the motor 230 is transmitted to the driven gear 220, the rotation shaft 220a of the driven gear 220 rotates, and the rotation shaft 207a of the conveying roller 207 connected to the rotation shaft 220a of the driven gear 220 via the Oldham coupling 256 also rotates.

Further, pulleys 223a and 223b are attached to the rotation shaft 207a of the conveying roller 207 and a rotation shaft 203a of the feeding roller 203, respectively. A rotating belt 225 is wound around the pulleys 223a and 223b. The driving force of the motor 230 transmitted to the rotation shaft 207a of the conveying roller 207 is transmitted to the rotation shaft 203a of the feeding roller 203 via the pulleys 223a and 223b and the rotating belt 225.

As illustrated in FIGS. 20A and 20B, the ADF 82 includes an upper guide plate 273a and the lower guide plate 273b, and the upper guide plate 273a and the lower guide plate 273b form a conveyance path H for conveying the sheet S which is an original. The upper guide plate 273a is supported by the opening/closing cover 209. The lower guide plate 273b is supported by the housing 50 of the ADF 82. As described above, the rotation shaft 255a that axially supports the drive gear 255 is integrally formed with the lower guide plate 273b.

When the opening/closing cover 209 rotates from the close position to the open position, the upper guide plate 273a supported by the opening/closing cover 209 rotates together, and a conveyance path H from an original tray 251 to a contact glass 303 is exposed. The user can easily remove the sheet S that remains in the conveyance path H and causes the jam, by positioning the opening/closing cover 209 at the open position as described above.

Here, since the conveying roller 207 is supported by the opening/closing cover 209 as described above, when the opening/closing cover 209 is positioned at the open position (second position), the driven gear 220 is separated from the drive gear 255 to be a state where the driven gear 220 and the drive gear 255 do not mesh with each other, such that the driving force cannot be transmitted. On the other hand, when the opening/closing cover 209 is positioned at the close position (first position), the driven gear 220 and the drive gear 255 mesh with each other, and the driving force of the motor 230 is transmitted from the drive gear 255 to the driven gear 220, such that the conveying roller 207 rotates.

It is not easy to ensure position accuracy of the opening/closing cover 209 with respect to the housing 50 of the ADF 82 due to a backlash of a rotating portion of the opening/closing cover 209 or variation in size. Therefore, it is not easy to ensure a degree of parallelization of the rotation shaft 255a of the drive gear 255 and the rotation shaft 207a of the conveying roller 207. In a case where the degree of parallelization of the rotation shaft 255a of the drive gear 255 and the rotation shaft 207a of the conveying roller 207 is not ensured, the above-described meshing error or parallelization error may occur between the drive gear 255 and the driven gear 220. Therefore, a holder member 407 and the springs 8a and 8b suppress deterioration in the degree of parallelization of the rotation shaft 255a of the drive gear 255 and the rotation shaft 207a of the conveying roller 207.

As illustrated in FIGS. 19 and 20, the holder member 407 (holding member) is a resin member provided in the housing 50 and formed of a polyacetal resin (POM) or an ABS resin. The holder member 407 has fitting holes 407a and 407b (first fitting hole and second fitting hole) into which the bearings 405a and 405b attached to the rotation shaft 255a of the drive gear 255 are fitted, respectively. Further, the holder member 407 has fitting grooves 407c and 407d (first fitting groove portion and second fitting groove portion) into which the bearings 406a and 406b attached to the rotation shaft 220a of the driven gear 220 are fitted, respectively.

As described above, the driven gear 220 is supported by the opening/closing cover 209. Therefore, the bearings 406a and 406b attached to the rotation shaft 220a of the driven gear 220 rotate by the rotation of the opening/closing cover 209, together with the rotation shaft 220a of the driven gear 220, in a state where the rotation shaft 220a is inserted into openings of the bearings 406a and 406b. The fitting groove 407c of the holder member 407 is a groove that is formed on a movement locus of the bearing 406a moving by the rotation of the opening/closing cover 209, and extends in a rotation direction of the opening/closing cover 209. The fitting groove 407d is a groove that is formed on the movement locus of the bearing 406b moving by the rotation of the opening/closing cover 209, and extends in the rotation direction of the opening/closing cover 209. The fitting grooves 407c and 407d can also be referred to as recess portions that are recessed in the rotation direction of the opening/closing cover 209 from a surface of the holder member 407 that faces opening/closing cover 209.

Further, the spring 8a (first biasing member) and the spring 8b (second biasing member), which are compression coil springs, are attached to the opening/closing cover 209. One end portions of the springs 8a and 8b are attached to and held by bosses 18a and 18b formed on the opening/closing cover 209, respectively. The other end portions of the springs 8a and 8b are in contact with the bearings 406a and 406b, respectively, and apply a force to the bearings 406a and 406b. Specifically, when the opening/closing cover 209 is positioned at the close position, the spring 8a applies a force to the bearing 406b together with the rotation shaft 220a of the driven gear 220 toward the back side of the fitting groove 407c, and the spring 8b applies a force to the bearing 406b together with the rotation shaft 220a toward the back side of the fitting groove 407d.

As illustrated in FIG. 20A, when the opening/closing cover 209 is positioned at the open position, the bearings 406a and 406b attached to the rotation shaft 220a of the driven gear 220 are separated from the holder member 407, and thus are not held by the holder member 407. On the other hand, the bearings 405a and 405b attached to the rotation shaft 255a of the drive gear 255 are fitted into and held by the fitting holes 407a and 407b of the holder member 407, respectively. In this state, the drive gear 255 and the driven gear 220 do not mesh with each other.

In a process in which the opening/closing cover 209 moves from the open position to the close position, the bearings 406a and 406b attached to the rotation shaft 220a of the driven gear 220 enter the inside of the fitting grooves 407c and 407d while being guided by inner walls of the fitting grooves 407c and 407d, respectively. Thereafter, as illustrated in FIG. 20B, the bearings 406a and 406b abut on inner walls on the back side of the fitting grooves 407c and 407d, and are fitted into and held by the fitting grooves 407c and 407d, respectively, when the opening/closing cover 209 moves to the close position.

Further, when the bearing 406a is fitted into the fitting groove 407c, the spring 8a applies a force to the bearing 406a toward the back side of the fitting groove 407c. Similarly, when the bearing 406b is fitted into the fitting groove 407d, the spring 8b applies a force to the bearing 406b toward the back side of the fitting groove 407d. When the motor 230 is driven in a state where the bearings 405a and 405b and the bearings 406a and 406b are held by the holder member 407, the bearings 405a and 405b and the bearings 406a and 406b are held by the holder member 407 in a non-rotating state. Further, the rotation shaft 255a of the drive gear 255 and the rotation shaft 220a of the driven gear 220 rotate.

As described above, the holder member 407 integrally holds the bearing 405a arranged on one side of the drive gear 255 in the rotational axis direction of the drive gear 255, and the bearing 405b arranged on the other side of the drive gear 255 at predetermined positions. Further, the holder member 407 integrally holds the bearing 406a arranged on one side of the driven gear 220 in the rotational axis direction of the driven gear 220, and the bearing 406b arranged on the other side of the driven gear 220 at predetermined positions. As a result, it is possible to suppress the deterioration in the degree of parallelization of the rotation shaft 255a of the drive gear 255 to which the bearings 405a and 405b are attached and the rotation shaft 220a of the driven gear 220 to which the bearings 406a and 406b are attached. Therefore, it is possible to suppress the occurrence of the above-described meshing error and parallelization error between the drive gear 255 and the driven gear 220, and it is possible to suppress uneven wear between the drive gear 255 and the driven gear 220, a driving force transmission error, and abnormal noise.

When the opening/closing cover 209 is positioned at the close position, the spring 8a applies a force to the bearing 406a attached to the rotation shaft 220a of the driven gear 220 toward the back side of the fitting groove 407c. Similarly, the spring 8b applies a force to the bearing 406b attached to the rotation shaft 220a of the driven gear 220 toward the back side of the fitting groove 407d. Thereby, the rotation shaft 220a of the driven gear 220 is prevented from moving in a direction of the movement of the opening/closing cover 209 from the close position to the open position. Accordingly, the rotation shaft 220a of the driven gear 220 is prevented from moving in the fitting grooves 407c and 407d when the opening/closing cover 209 is positioned at the close position. Therefore, it is possible to more effectively suppress the deterioration in the degree of parallelization of the rotation shaft 255a of the drive gear 255 and the rotation shaft 220a of the driven gear 220.

Meanwhile, there is a possibility that, when the opening/closing cover 209 moves from the open position to the close position, the bearings 406a and 406b reach the inner walls on the back side of the fitting grooves 407c and 407d, respectively, before the opening/closing cover 209 reaches the close position, due to the influence of the tolerance of the holder member 407, or the like. In this case, the opening/closing cover 209 may not be completely closed. In the present embodiment, the rotation shaft of the driven gear 220 is loosely fitted into the through holes (not illustrated) of the opening/closing cover 209, and the degree of freedom of movement is secured. In such a case, the opening/closing cover 209 can move to the close position. Accordingly, it is possible to suppress that the opening/closing cover 209 becomes unable to move to the close position.

The rotation shaft 220a of the driven gear 220 is connected to the rotation shaft 207a of the conveying roller 207 by the Oldham coupling 256. As a result, it is possible to absorb an angle of deviation between the rotation shaft 220a of the driven gear 220 and the rotation shaft 207a of the conveying roller 207, the angle of deviation being caused by the holder member 407.

The configuration in which the rotation shaft 255a of the drive gear 255 and the rotation shaft 220a of the driven gear 220 are held by the holder member 407 via the bearings 405a and 405b and the bearings 406a and 406b has been described in the present embodiment. However, the present invention is not limited thereto. That is, in a configuration in which the drive gear 255 or the driven gear 220 is held so as to be rotatable with respect to each rotation shaft thereof, the rotation shaft 255a of the drive gear 255 or the rotation shaft 220a of the driven gear 220 may be directly held by the holder member 407 without using the bearings. In this case, a portion (first portion) on one side of the rotation shaft 255a of the drive gear 255 with respect to the drive gear 255 in the rotational axis direction of the drive gear 255 is held by the fitting hole 407a, and a portion (second portion) on the other side is held by the fitting hole 407b. Further, a portion (third portion) on one side of the rotation shaft 220a of the driven gear 220 with respect to the driven gear 220 in the rotational axis direction of the driven gear 220 is held by the fitting groove 407c, and a portion (fourth portion) on the other side is held by the fitting groove 407d. The springs 8a and 8b are provided so as to be in direct contact with the rotation shaft 220a of the driven gear 220. As a result, the same effect as described above can be obtained.

In the present embodiment, the configuration in which the holder member 407 is provided in the housing 50 of the ADF 82 has been described, but the present invention is not limited thereto. That is, the holder member 407 may be provided on the opening/closing cover 209. In this case, the bearings 406a and 406b attached to the rotation shaft 220a of the driven gear 220 are fitted into the fitting holes 407a and 407b, respectively. Further, the bearings 405a and 405b attached to the rotation shaft 255a of the drive gear 255 are fitted into the fitting grooves 407c and 407d, respectively. As a result, the same effect as described above can be obtained.

Third Embodiment

Next, a configuration of an image forming apparatus according to a third embodiment of the present invention will be described. The same portions as those in the first and second embodiments will be denoted by the same reference numerals, and a description thereof will be omitted.

In the present embodiment, in a driving portion that drives a conveying roller 42, a holder member 507 is provided on a right door 11, and a spring holding member 58 is provided on a housing 1. A configuration other than the driving portion that drives the conveying roller 42 is the same as the configuration of the second embodiment.

Figure 21:
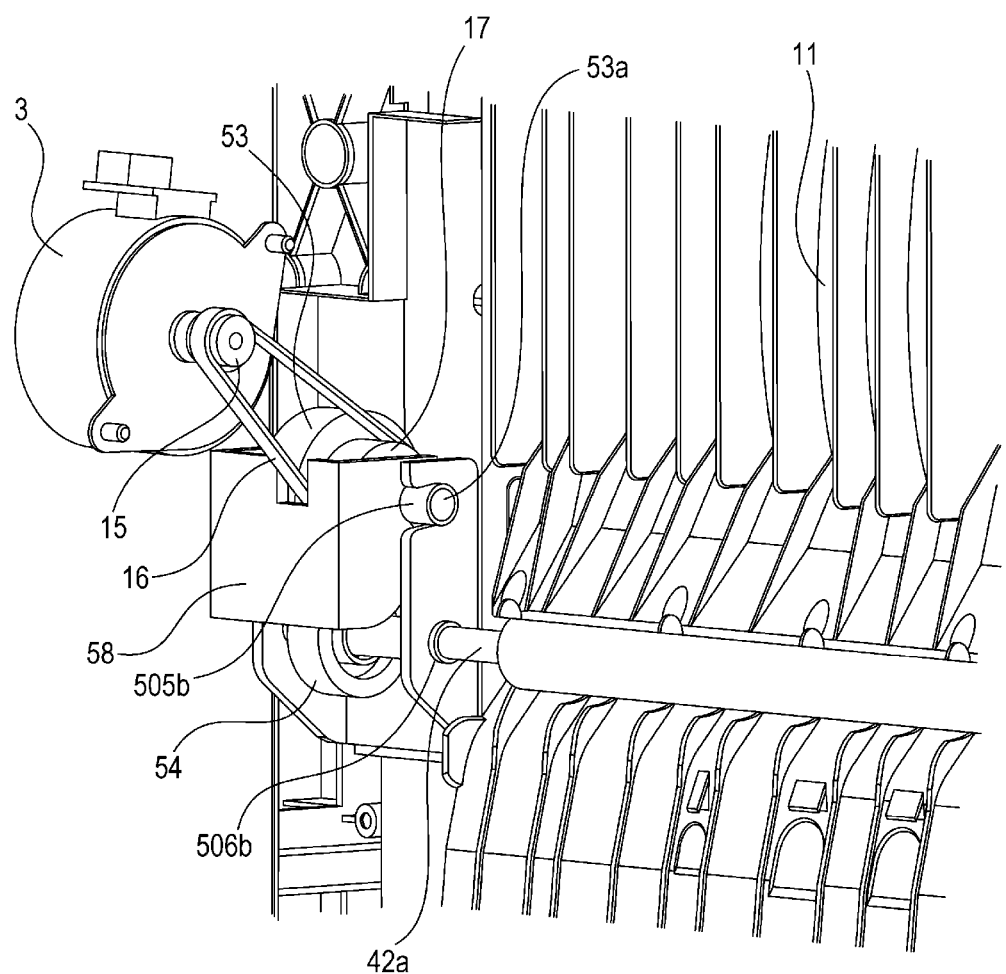
FIG. 21 is a schematic view of a driving portion that drives a conveying roller.
Figure 22A:
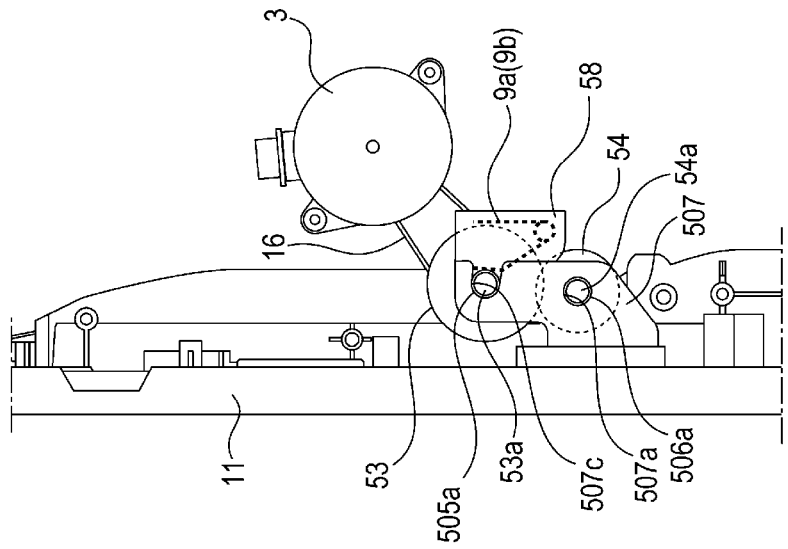
FIGS. 22A and 22B are each a schematic cross-sectional view illustrating a region around a holder member.
Figure 22B:
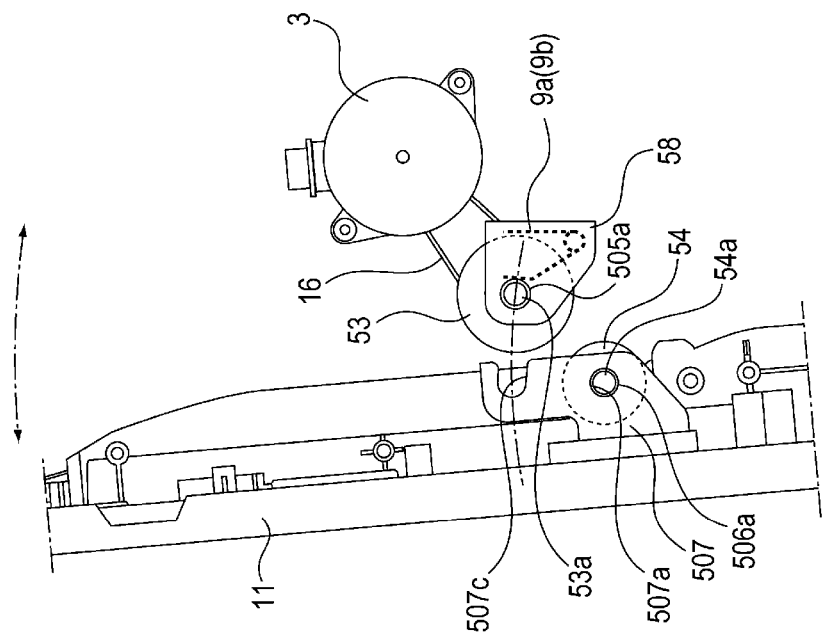

FIG. 21 is a perspective view of the driving portion that drives the conveying roller 42 according to the present embodiment. FIGS. 22A and 22B are each a schematic cross-sectional view illustrating a region around the holder member 507 according to the present embodiment. Here, FIG. 22A illustrates a state where the right door 11 is positioned at a close position, and FIG. 22B illustrates a state where the right door 11 is positioned at an open position.

As illustrated in FIG. 21, a pulley 15 is attached to a rotation shaft of a motor 3 provided in the housing 1. Further, a drive gear 53 is provided in the housing 1. A pulley 17 is attached to a rotation shaft 53a of the drive gear 53. A driving force transmission belt 16 is stretched over the pulley 15 attached to the rotation shaft of the motor 3 and the pulley 17 attached to the rotation shaft 53a of the drive gear 53. Therefore, a driving force of the motor 3 is transmitted to the drive gear 53 via the driving force transmission belt 16.

The right door 11 supports the conveying roller 42 as in the first embodiment. A driven gear 54 that meshes with the drive gear 53 when the right door 11 is positioned at the close position is press-fitted onto a rotation shaft 42a of the conveying roller 42. That is, in the present embodiment, a rotation shaft of the driven gear 54 is the rotation shaft 42a of the conveying roller 42.

Since the conveying roller 42 is supported by the right door 11, when the right door 11 is positioned at the open position, the driven gear 54 is separated from the drive gear 53 to be a state where the driven gear 54 and the drive gear 53 do not mesh with each other, such that the driving force cannot be transmitted. On the other hand, when the right door 11 is positioned at the close position, the driven gear 54 and the drive gear 53 mesh with each other, and the driving force of the motor 3 is transmitted from the drive gear 53 to the driven gear 54. That is, when the right door 11 is positioned at the close position, the driving force of the motor 3 is transmitted to the conveying roller 42 via the driving force transmission belt 16, the drive gear 53, and the driven gear 54, such that the conveying roller 42 rotates.

Here, the holder member 507 is provided on the right door 11 in order to suppress deterioration in a degree of parallelization of the rotation shaft 53a of the drive gear 53 and the rotation shaft 42a of the driven gear 54. Bearings 506a and 506b attached to the rotation shaft 42a of the driven gear 54 are fitted into and held by fitting holes 507a and 507b of the holder member 507, respectively. The bearing 506a is arranged adjacent to the driven gear 54 on one side of the driven gear 54 in a rotational axis direction of the driven gear 54, and the bearing 506b is arranged adjacent to the driven gear 54 on the other side of the driven gear 54 (see FIGS. 22A and 22B).

Further, bearings 505a and 505b attached to the rotation shaft 53a of the drive gear 53 are fitted into and held by fitting grooves 507c and 507d of the holder member 507, respectively. The fitting grooves 507c and 507d are grooves extending in a rotation direction of the right door 11, respectively. The bearing 505a is arranged adjacent to the drive gear 53 on one side of the drive gear 53 in a rotational axis direction of the drive gear 53, and the bearing 505b is arranged adjacent to the drive gear 53 on the other side of the drive gear 53.

As illustrated in FIGS. 22A and 22B, the spring holding member 58 is provided in the housing 1. The bearings 505a and 505b attached to the rotation shaft 53a of the drive gear 53 are fitted into through holes 58c and 58d of the spring holding member 58, respectively. Since diameters of the through holes 58c and 58d are about 1 mm larger than diameters of the bearings 505a and 505b, respectively, the bearings 505a and 505b are loosely fitted into the through holes 58c and 58d, respectively.

A spring 9a held by the spring holding member 58 is in contact with the bearing 505a attached to the rotation shaft 53a of the drive gear 53, and applies a force to the bearing 505a. Similarly, a spring 9b held by the spring holding member 58 is in contact with the bearing 505b attached to the rotation shaft 53a of the drive gear 53, and applies a force to the bearing 505b. When the right door 11 is positioned at the close position, the spring 9a applies a force to the bearing 505b together with the rotation shaft 53a of the drive gear 53 toward the back side of the fitting groove 507c, and the spring 9b applies a force to the bearing 505b together with the rotation shaft 53a of the drive gear 53 toward the back side of the fitting groove 507d.

As illustrated in FIG. 22A, when the right door 11 is positioned at the open position, the bearings 505a and 505b attached to the rotation shaft 53a of the drive gear 53 are separated from the holder member 507, and thus the bearings 505a and 505b are not held by the holder member 507. On the other hand, the bearings 506a and 506b attached to the rotation shaft 42a of the driven gear 54 are fitted into and held by the fitting holes 507a and 507b of the holder member 507, respectively. In this state, the drive gear 53 and the driven gear 54 do not mesh with each other.

In a process in which the right door 11 moves from the open position to the close position, the bearings 505a and 505b attached to the rotation shaft 53a of the drive gear 53 enter the inside of the fitting grooves 507c and 507d while being guided by inner walls of the fitting grooves 507c and 507d, respectively. Thereafter, as illustrated in FIG. 22B, the bearings 505a and 505b abut on inner walls on the back side of the fitting grooves 507c and 507d, and are fitted into and held by the fitting grooves 507c and 507d, respectively, when the right door 11 moves to the close position. Further, when the bearing 505a is fitted into the fitting groove 507c, the spring 9a applies a force to the bearing 505a toward the back side of the fitting groove 507c. Similarly, when the bearing 505b is fitted into the fitting groove 507d, the spring 9b applies a force to the bearing 505b toward the back side of the fitting groove 507d.

As described above, the holder member 507 integrally holds the bearing 505a arranged on one side of the drive gear 53 in the rotational axis direction of the drive gear 53, and the bearing 505b arranged on the other side of the drive gear 53 at predetermined positions. Further, the holder member 507 integrally holds the bearing 506a arranged on one side of the driven gear 54 in the rotational axis direction of the driven gear 54, and the bearing 506b arranged on the other side of the driven gear 54 at predetermined positions. As a result, it is possible to suppress the deterioration in the degree of parallelization of the rotation shaft 53a of the drive gear 53 to which the bearings 505a and 505b are attached and the rotation shaft 42a of the driven gear 54 to which the bearings 506a and 506b are attached. Therefore, it is possible to suppress the occurrence of the above-described meshing error and parallelization error between the drive gear 53 and the driven gear 54, and it is possible to suppress uneven wear between the drive gear 53 and the driven gear 54, a driving force transmission error, and abnormal noise.

When the right door 11 is positioned at the close position, the spring 9a applies a force to the bearing 505a attached to the rotation shaft 53a of the drive gear 53 toward the back side of the fitting groove 507c. Similarly, the spring 9b applies a force to the bearing 505b attached to the rotation shaft 53a of the drive gear 53 toward the back side of the fitting groove 507d. Thereby, the rotation shaft 53a of the drive gear 53 is prevented from moving in a direction of the movement of the right door 11 from the close position to the open position. Accordingly, when the right door 11 is positioned at the close position, the rotation shaft 53a of the drive gear 53 is prevented from moving inside the fitting grooves 507c and 507d, and the degree of parallelization of the rotation shaft 53a of the drive gear 53 and the rotation shaft 42a of the driven gear 54 can be more effectively suppressed.

Meanwhile, there is a possibility that, when the right door 11 moves from the open position to the close position, the bearings 505a and 505b reach the inner walls on the back side of the fitting grooves 507c and 507d, respectively, before the right door 11 reaches the close position, due to the influence of the tolerance of the holder member 507, or the like, such that the right door 11 is not completely closed. In the present embodiment, since the diameters of the through holes 58c and 58d are about 1 mm larger than the diameters of the bearings 505a and 505b, respectively, in such a case, the right door 11 can move together with the spring holding member 58 by about 1 mm toward the close position. Therefore, it is possible to suppress that the right door 11 becomes unable to move to the close position.

Further, in the present embodiment, since the driven gear 54 is supported by the rotation shaft 42a of the conveying roller 42, the number of members supported by the right door 11 is smaller than that of the second embodiment, such that a total weight of the right door 11 is reduced. As a result, the user can easily open and close the right door 11, such that usability is improved.

In the second and third embodiments, a torsion coil spring is used as a biasing member that applies a force to the rotation shaft 54a of the driven gear 54, and a compression coil spring is used as a biasing member that applies a force to the rotation shaft 54a of the driven gear 54. However, the present invention is not limited thereto. That is, the same effect as described above can be obtained even with a configuration in which another spring, rubber, or the like is used as the biasing member.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2019-095116, filed May 21, 2019, and Japanese Patent Application No. 2019-095114, filed May 21, 2019, which are hereby incorporated by reference herein in their entirety.

What is claimed is:

1. An image forming apparatus comprising:
a motor which is provided in a housing of the image forming apparatus;
a first gear which includes a rotation shaft axially supported by the housing and rotating by a driving force of the motor;
a first bearing and a second bearing which support the rotation shaft of the first gear and are arranged on one side and the other side of the first gear, respectively, in a rotational axis direction of the first gear;
a second gear which includes a rotation shaft and meshes with the first gear, the rotation shaft rotating by the driving force of the motor transmitted via the first gear;
a rotating member to which the second gear is attached and which is rotatable with respect to the housing so as to be positioned at a first position at which the first gear and the second gear mesh with each other and at a second position at which the second gear is separated from the first gear;
a third bearing and a fourth bearing which support the rotation shaft of the second gear and are arranged on one side and the other side of the second gear, respectively, in a rotational axis direction of the second gear; and
a holding member which is provided in the housing integrally holds the first bearing and the second bearing, the holding member having a first groove portion which is formed on a movement locus of the third bearing moving by the rotation of the rotating member, into which the third bearing enters when the rotating member moves from the second position to the first position, and which holds the third bearing when the rotating member is positioned at the first position, and extends in a rotation direction of the rotating member, and the holding member having a second groove portion which is formed on a movement locus of the fourth bearing moving by the rotation of the rotating member, into which the fourth bearing enters when the rotating member moves from the second position to the first position, and which holds the fourth bearing when the rotating member is positioned at the first position, and extends in the rotation direction of the rotating member.

2. The image forming apparatus according to claim 1, wherein
the first groove portion has a first protrusion which protrudes in a direction orthogonal to the rotation direction of the rotating member and the rotational axis direction of the second gear, the first protrusion preventing the third bearing held by the first groove portion when the rotating member is positioned at the first position from moving in a direction of movement of the rotating member from the first position to the second position, and
the second groove portion has a second protrusion which protrudes in the direction orthogonal to the rotation direction of the rotating member and the rotational axis direction of the second gear, the second protrusion preventing the fourth bearing held by the second groove portion when the rotating member is positioned at the first position from moving in the direction of movement of the rotating member from the first position to the second position.

3. The image forming apparatus according to claim 1, wherein the first groove portion has a first inclined portion of which width in a direction orthogonal to the rotation direction of the rotating member and the rotational axis direction of the second gear is decreased toward a back side of the first groove portion, and the second groove portion has a second inclined portion of which width in the direction orthogonal to the rotation direction of the rotating member and the rotational axis direction of the second gear is decreased toward a back side of the second groove portion.

4. The image forming apparatus according to claim 1, wherein in the holding member, a first hole for bending a portion on which the third bearing abuts when the third bearing is fitted into the first groove portion is provided around the first groove portion, and a second hole for bending a portion on which the fourth bearing abuts when the fourth bearing is fitted into the second groove portion is provided around the second groove portion.

5. The image forming apparatus according to claim 1, wherein the holding member has a first fitting hole into which the first bearing is fitted, and a second fitting hole into which the second bearing is fitted.

6. The image forming apparatus according to claim 1, wherein the first gear is attached to a rotation shaft of the motor.

7. The image forming apparatus according to claim 1, further comprising a conveying roller which is supported by the rotating member, rotates by the driving force of the motor transmitted via the second gear, and conveys a sheet.

8. An image reading apparatus comprising:
a motor which is provided in a housing of the image reading apparatus;

a first gear which includes a rotation shaft axially supported by the housing and rotating by a driving force of the motor;

a first bearing and a second bearing which support the rotation shaft of the first gear and are arranged on one side and the other side of the first gear, respectively, in a rotational axis direction of the first gear;

a second gear which includes a rotation shaft and meshes with the first gear, the rotation shaft rotating by the driving force of the motor transmitted via the first gear;

a rotating member to which the second gear is attached and which is rotatable with respect to the housing so as to be positioned at a first position at which the first gear and the second gear mesh with each other and at a second position at which the second gear is separated from the first gear;

a third bearing and a fourth bearing which support the rotation shaft of the second gear and are arranged on one side and the other side of the second gear, respectively, in a rotational axis direction of the second gear; and a holding member which is provided in the housing integrally holds the first bearing and the second bearing, the holding member having a first groove portion which is formed on a movement locus of the third bearing moving by the rotation of the rotating member, into which the third bearing enters when the rotating member moves from the second position to the first position, and which holds the third bearing when the rotating member is positioned at the first position, and extends in a rotation direction of the rotating member, and the holding member having a second groove portion which is formed on a movement locus of the fourth bearing moving by the rotation of the rotating member, into which the fourth bearing enters when the rotating member moves from the second position to the first position, and which holds the fourth bearing when the rotating member is positioned at the first position, and extends in the rotation direction of the rotating member.

9. The image reading apparatus according to claim 8, wherein the first groove portion has a first protrusion which protrudes in a direction orthogonal to the rotation direction of the rotating member and the rotational axis direction of the second gear, the first protrusion preventing the third bearing held by the first groove portion when the rotating member is positioned at the first position from moving in a direction of movement of the rotating member from the first position to the second position, and the second groove portion has a second protrusion which protrudes in the direction orthogonal to the rotation direction of the rotating member and the rotational axis direction of the second gear, the second protrusion preventing the fourth bearing held by the second groove portion when the rotating member is positioned at the first position from moving in the direction of movement of the rotating member from the first position to the second position.

10. The image reading apparatus according to claim 8, wherein the first groove portion has a first inclined portion of which width in a direction orthogonal to the rotation direction of the rotating member and the rotational axis direction of the second gear is decreased toward a back side of the first groove portion, and the second groove portion has a second inclined portion of which width in the direction orthogonal to the rotation direction of the rotating member and the rotational axis direction of the second gear is decreased toward a back side of the second groove portion.

11. The image reading apparatus according to claim 8, wherein in the holding member, a first hole for bending a portion on which the third bearing abuts when the third bearing is fitted into the first groove portion is provided around the first groove portion, and a second hole for bending a portion on which the fourth bearing abuts when the fourth bearing is fitted into the second groove portion is provided around the second groove portion.

12. The image reading apparatus according to claim 8, wherein the holding member has a first fitting hole into which the first bearing is fitted, and a second fitting hole into which the second bearing is fitted.

13. The image reading apparatus according to claim 8, wherein the first gear is attached to a rotation shaft of the motor.

14. The image reading apparatus according to claim 8, further comprising a conveying roller which is supported by the rotating member, rotates by the driving force of the motor transmitted via the second gear, and conveys a sheet.

\* \* \* \* \*